United States Patent
Wilensky et al.

(10) Patent No.: US 9,436,382 B2
(45) Date of Patent: Sep. 6, 2016

(54) NATURAL LANGUAGE IMAGE EDITING

(71) Applicant: Adobe Systems Incorporated, San Jose, CA (US)

(72) Inventors: Gregg D. Wilensky, Pacific Palisades, CA (US); Walter W. Chang, San Jose, CA (US); Lubomira A. Dontcheva, San Francisco, CA (US); Gierad P. Laput, Canton, MI (US); Aseem O. Agarwala, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 74 days.

(21) Appl. No.: 13/683,278

(22) Filed: Nov. 21, 2012

(65) Prior Publication Data

US 2014/0078075 A1 Mar. 20, 2014

Related U.S. Application Data

(63) Continuation of application No. 61/702,590, filed on Sep. 18, 2012.

(51) Int. Cl.
| | | |
|---|---|---|
| *G06F 3/0488* | (2013.01) | |
| *G10L 15/26* | (2006.01) | |
| *G06F 9/44* | (2006.01) | |
| *G06T 11/60* | (2006.01) | |
| *G10L 15/18* | (2013.01) | |

(52) U.S. Cl.
CPC ......... *G06F 3/04883* (2013.01); *G06F 3/0488* (2013.01); *G06F 9/4443* (2013.01); *G06T 11/60* (2013.01); *G10L 15/265* (2013.01); *G10L 15/1822* (2013.01); *G10L 15/26* (2013.01)

(58) Field of Classification Search
CPC . G06F 3/0488; G06F 3/04883; G10L 15/26; G10L 15/265
USPC .................................................. 345/156, 173
See application file for complete search history.

(56) References Cited

U.S. PATENT DOCUMENTS

| | | | |
|---|---|---|---|
| 4,726,065 | A | 2/1988 | Froessl |
| 5,526,020 | A | 6/1996 | Campanelli et al. |
| 6,133,904 | A | 10/2000 | Tzirkel-Hancock |
| 6,243,713 | B1 | 6/2001 | Nelson et al. |
| 6,278,967 | B1 | 8/2001 | Akers et al. |
| 6,970,185 | B2 | 11/2005 | Halverson |
| 7,493,253 | B1 | 2/2009 | Ceusters et al. |
| 7,539,619 | B1 | 5/2009 | Seligman et al. |
| 7,593,603 | B1 | 9/2009 | Wilensky |
| 7,739,597 | B2 | 6/2010 | Wong et al. |
| 7,844,458 | B2 * | 11/2010 | Hirota ................. G10L 15/1822 704/252 |

(Continued)

OTHER PUBLICATIONS

"Non-Final Office Action", U.S. Appl. No. 13/683,466, May 9, 2014, 21 pages.

(Continued)

*Primary Examiner* — Amare Mengistu
*Assistant Examiner* — Jennifer Zubajlo
(74) *Attorney, Agent, or Firm* — Wolfe-SBMC

(57) ABSTRACT

Natural language image editing techniques are described. In one or more implementations, a natural language input is converted from audio data using a speech-to-text engine. A gesture is recognized from one or more touch inputs detected using one or more touch sensors. Performance is then initiated of an operation identified from a combination of the natural language input and the recognized gesture.

20 Claims, 13 Drawing Sheets

(56) References Cited

U.S. PATENT DOCUMENTS

| | | | |
|---|---|---|---|
| 7,912,702 B2 | 3/2011 | Bennett | |
| 7,978,938 B1 | 7/2011 | Wilensky | |
| 8,150,107 B2 * | 4/2012 | Kurzweil | G06F 3/017 348/62 |
| 8,218,026 B2 | 7/2012 | Oishi | |
| 8,374,871 B2 | 2/2013 | Ehsani et al. | |
| 8,442,812 B2 | 5/2013 | Ehsani et al. | |
| 8,619,147 B2 * | 12/2013 | King | H04N 1/00244 348/210.99 |
| 9,141,335 B2 * | 9/2015 | Wilensky | G06T 11/60 |
| 2002/0069070 A1 | 6/2002 | Boys et al. | |
| 2003/0093419 A1 * | 5/2003 | Bangalore | G01C 21/3664 |
| 2003/0204814 A1 | 10/2003 | Elo et al. | |
| 2004/0181390 A1 | 9/2004 | Manson | |
| 2005/0080611 A1 | 4/2005 | Huang et al. | |
| 2006/0047617 A1 | 3/2006 | Bacioiu et al. | |
| 2006/0155693 A1 | 7/2006 | Chowdhury et al. | |
| 2007/0057930 A1 * | 3/2007 | Iwema | G06F 3/0481 345/179 |
| 2007/0179777 A1 | 8/2007 | Gupta et al. | |
| 2007/0225969 A1 | 9/2007 | Coffman et al. | |
| 2007/0238520 A1 | 10/2007 | Kacmarcik | |
| 2008/0003547 A1 | 1/2008 | Woolfe et al. | |
| 2008/0007749 A1 | 1/2008 | Woolfe | |
| 2008/0252595 A1 | 10/2008 | Boillot | |
| 2009/0256947 A1 | 10/2009 | Ciurea et al. | |
| 2010/0121636 A1 * | 5/2010 | Burke | G06F 3/0346 704/233 |
| 2010/0191773 A1 | 7/2010 | Stefik et al. | |
| 2010/0280829 A1 | 11/2010 | Gopi et al. | |
| 2011/0007078 A1 | 1/2011 | Cao et al. | |
| 2011/0082710 A1 | 4/2011 | Subash et al. | |
| 2011/0099157 A1 * | 4/2011 | LeBeau | H04M 1/72533 707/706 |
| 2011/0106534 A1 | 5/2011 | Lebeau et al. | |
| 2011/0150321 A1 | 6/2011 | Cheong et al. | |
| 2011/0167064 A1 | 7/2011 | Achtermann et al. | |
| 2011/0246204 A1 | 10/2011 | Chen et al. | |
| 2011/0304729 A1 | 12/2011 | Arcaini et al. | |
| 2012/0022876 A1 | 1/2012 | Lebeau et al. | |
| 2012/0035932 A1 * | 2/2012 | Jitkoff | G01C 21/3608 704/254 |
| 2012/0042022 A1 | 2/2012 | Sheth et al. | |
| 2012/0151326 A1 | 6/2012 | Cross, Jr. et al. | |
| 2012/0166180 A1 | 6/2012 | Au | |
| 2012/0191460 A1 * | 7/2012 | Ng-Thow-Hing | G10L 21/10 704/272 |
| 2012/0280915 A1 | 11/2012 | Kyllonen et al. | |
| 2013/0086105 A1 | 4/2013 | Hammontree et al. | |
| 2013/0152007 A1 | 6/2013 | Costenaro et al. | |
| 2013/0283185 A1 | 10/2013 | Mock | |
| 2014/0078076 A1 | 3/2014 | Wilensky | |
| 2014/0081625 A1 | 3/2014 | Wilensky | |
| 2014/0081626 A1 | 3/2014 | Chang | |
| 2014/0082003 A1 | 3/2014 | Feldman | |
| 2014/0082500 A1 | 3/2014 | Wilensky | |
| 2014/0185862 A1 * | 7/2014 | Kamath | G06Q 20/3829 382/100 |

OTHER PUBLICATIONS

"Non-Final Office Action", U.S. Appl. No. 13/683,341, Aug. 19, 2014, 15 pages.

"Final Office Action", U.S. Appl. No. 13/683,466, Aug. 21, 2014, 25 pages.

"Final Office Action", U.S. Appl. No. 13/683,341, Jan. 16, 2015, 16 pages.

"Non-Final Office Action", U.S. Appl. No. 13/683,416, Mar. 18, 2015, 14 pages.

"Non-Final Office Action", U.S. Appl. No. 13/683,466, Dec. 1, 2014, 29 pages.

"Non-Final Office Action", U.S. Appl. No. 13/683,509, Feb. 20, 2015, 18 pages.

"Final Office Action", U.S. Appl. No. 13/683,416, Aug. 5, 2015, 15 pages.

"Non-Final Office Action", U.S. Appl. No. 13/683,341, Jul. 6, 2015, 18 pages.

"Non-Final Office Action", U.S. Appl. No. 13/683,509, Jul. 8, 2015, 20 pages.

"Notice of Allowance", U.S. Appl. No. 13/683,466, May 8, 2015, 6 pages.

"Corrected Notice of Allowance", U.S. Appl. No. 13/683,466, Aug. 26, 2015, 4 pages.

"Non-Final Office Action", U.S. Appl. No. 13/683,416, Nov. 23, 2015, 15 pages.

"Final Office Action", U.S. Appl. No. 13/683,341, Nov. 19, 2015, 18 pages.

Notice of Allowance, U.S. Appl. No. 13/683,416, Mar. 29, 2016, 11 pages.

Non-Final Office Action, U.S. Appl. No. 13/683,509, Jun. 22, 2016, 14 pages.

Non-Final Office Action, U.S. Appl. No. 13/683,341, Mar. 22, 2016, 19 pages.

* cited by examiner

NATURAL LANGUAGE IMAGE EDITING

CROSS REFERENCE

This Application claims priority under 35 U.S.C. Section 119(e) to U.S. Provisional Application No. 61/702,590, filed Sep. 18, 2012, and titled "Natural Language Image Editing," the disclosure of which is hereby incorporated by reference in its entirety.

BACKGROUND

The functionality made available via image editing applications is ever increasing. For example, users may enhance, crop, composite, matte, and alter image data using a multitude of different operations.

However, the sheer number of choices of operations that are made available may make it difficult for a user to locate a particular operation of interest. This may include making the user aware of the operation and even locating functionality to initiate to operation once aware. Consequently, users may choose to forgo this functionality, which may hinder a user's experience with the applications.

SUMMARY

Natural language image editing techniques are described. In one or more implementations, a natural language input is converted from audio data using a speech-to-text engine. A gesture is recognized from one or more touch inputs detected using one or more touch sensors. Performance is then initiated of an operation identified from a combination of the natural language input and the recognized gesture.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Interaction with conventional image editing applications may be complex. The inclusion of a multitude of operations, for instance, may make it difficult for a user to discover a particular one of the operations. Additionally, even when the operations are discovered and understood, initiation of a desired operation in order to accomplish a particular image editing task by the user may involve multiple steps. These steps may be complex and often involve skills developed by professionals, and some operations may even tax the skills of the professionals.

Further, although some operations may be simpler to locate and initiate, these operations may involve multiple manual steps and therefore be considered tedious by a user. Yet further, although users may often know the type of operations to be performed on an image, these users may not be familiar with specific terminology used to invoke the operations. Consequently, novice and even professional users of conventional image editing applications may become frustrated with conventional techniques that are used to interact with the applications.

Natural language image editing techniques are described. In one or more implementations, a natural language processing module may be employed by an image editing application. This module may be used to parse a natural language input (e.g., speech, text, and so on) into parts and then categorize the parts of the input into patterns. In this way, the image editing application may determine a likely intent of a user that provided the natural language input, which may be used to initiate one or more intended operations of the image editing application. These operations may be employed in a variety of ways as further described in the following discussion.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
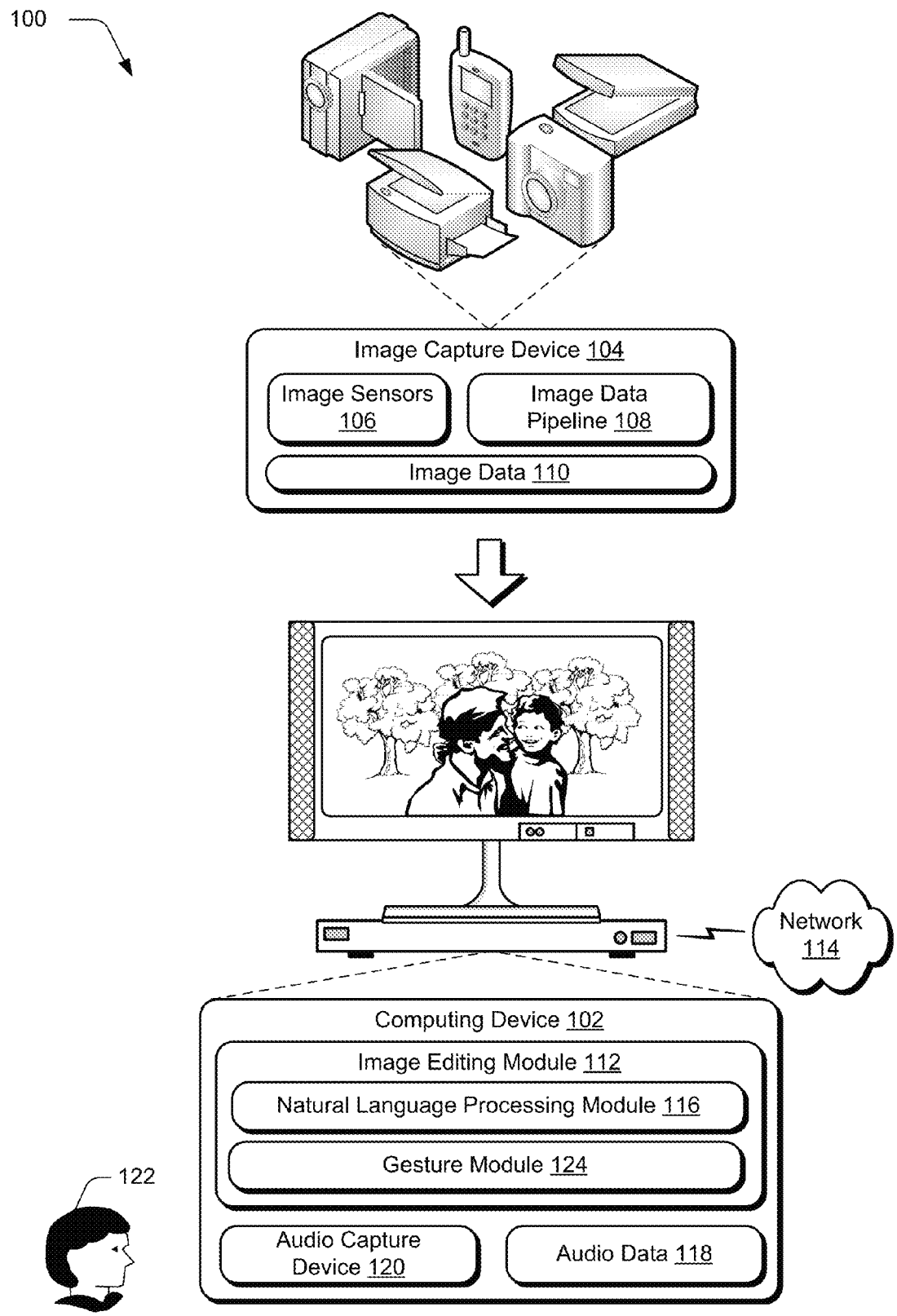
FIG. 1 is an illustration of an environment in an example implementation that is operable to employ techniques described herein relating to natural language image editing.

FIG. 1 is an illustration of an environment 100 in an example implementation that is operable to employ techniques described herein. The illustrated environment 100 includes a computing device 102 and an image capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 13.

The image capture device 104 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device, e.g., for a tablet configuration, smart phone as illustrated, and so forth.

The image capture device 104 is illustrated as including image sensors 106 and an image data pipeline 108 that are each configured to form image data 110. For example, the image sensors 106 may be configured to capture images using a Bayer pattern or other configurations. Therefore, in this instance, the image data 110 generated by the image sensors 106 may be considered to be in a raw image format.

The image data 110 may also be processed by an image data pipeline 108 using a variety of different operations. These operations may include operations in which the image data 110 is considered to remain in a substantially raw image format. Examples of these operations include interpolation of the image data in the raw format (e.g., a Bayer pattern) into a red, green, and blue image format, de-mosaicking, and linear processing operations. The image data pipeline 108 may also perform operations in which the image data 110 is not in a raw or substantially raw image format, such as to perform gamma correction, sharpening, de-noising, or other non-linear operations. Thus, the image data 110 may be configured according to a variety of different image formats.

Further, the image data 110 is not limited to capture by an image capture device 104. The image data 110, for instance, may be generated through interaction of a user with a user interface, automatically through execution of an application, and so on. Thus, the image data 110 may also originate from a variety of different sources.

Regardless of how the image data 110 is originated, the image data 110 may then be obtained by an image editing module 112. As before, although the image editing module 112 is illustrated as being implemented on a separate device it should be readily apparent that other implementations are also contemplated in which the image sensors 106 and image editing module 112 are implemented on the same device. Further, although illustrated as being provided by a computing device 102 in a desktop configuration, a variety of other configurations are also contemplated, such as remotely over a network 114 as part of a web platform as further described in relation to FIG. 13.

The image editing module 112 is representative of functionality that is configured to process the image data 110 using one or more operations. Examples of such functionality in FIG. 1 include operations to edit the image data 110, such as to change a display characteristic of one or more pixels described by the image data 110, decompose the image data 110, composite the image data 110 (e.g., with other image data to form a new image), and so forth. However, as previously described the sheer multitude of operations that may be made available may make it difficult to interact with the image editing module 112.

Accordingly, the image editing module 112 is illustrated as including a natural language processing module 116. The natural language processing module 116 is representative of functionality to process a natural language input, such as text, audio data 118, and so on. For example, the audio data 118 may be captured by an audio capture device 120 from a user 122. Other examples are also contemplated, such as audio data received via the network 114 (e.g., through configuration of the computing device 102 as part of a web service), and so on. The natural language processing module 116, for instance, may be configured to process audio data 118 to initiate one or more operations of the image editing module 112.

The image editing module 112 is also illustrated as including a gesture module 124. The gesture module 124 is representative of functionality to recognize gestures detected via touch or image functionality by the computing device 102. The computing device 102, for instance, may include a display device having touchscreen functionality, track pad, camera, and so on. These devices may be used to detect proximity of an object and recognize initiation of an operation based on this proximity, movement of the object, and so on. In this way, operations of the image editing module 112 may be implemented in a variety of ways, further description of which may be found in the following discussion and associated figure.

Figure 2:
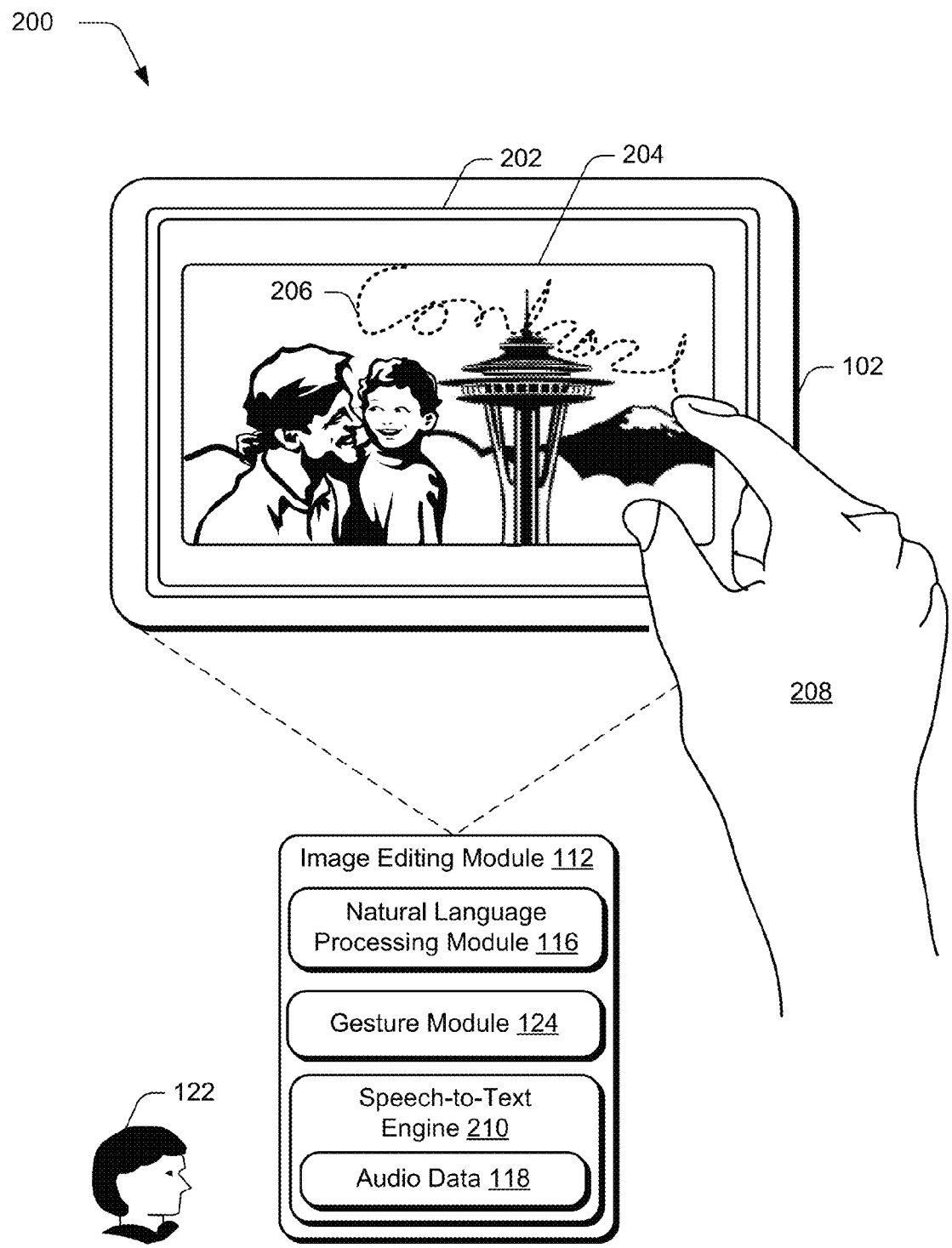
FIG. 2 depicts a system in an implementation in which an example of operation is shown of a natural language processing module and gesture module of an image editing module.

FIG. 2 depicts a system 200 in an example implementation in which an example of operation of the natural language processing module 116 and gesture module 124 of the image editing module 112 is shown. In this example, the computing device 102 is illustrated as assuming a hand-held configuration, such as a tablet computer although other examples are also contemplated. Through inclusion of the natural language processing module 116 and gesture module 124, operations of the image editing module 112 may be initiated in a variety of ways using a natural language input, such as via speech inputs, text, or a combination thereof.

The computing device 102 is illustrated as including a display device 202 that supports touch functionality, such as through the use of one or more touch sensors that are configured to detect proximity of an object through configuration as capacitive, resistive, or image capture sensors. An image 204 is displayed by the display device 202 of image data 110 obtained by the image editing module 112 as described in FIG. 1. By leveraging use of the natural language processing module 116, interaction with the image editing module 112 may be supported without the limitations encountered using conventional approaches.

For example, in the illustration a gesture 206 is illustrated in phantom as being input via a finger of a user's hand 208. The gesture 206 in this instance is used to specify an image editing operation that is to be performed by the image editing module 112, which in this instance is "contrast." Other examples of swipes and multi-contact gestures are also contemplated.

The image editing module 112 is also illustrated as including audio data 118 that is processed by a speech-to-text engine 210 to form a natural language input. The audio data 118, for instance, may specify a subject of the image editing operation. For example, a user 122 may provide a name of a landmark (e.g., "Space Needle") identify one or more people in the image 204 (e.g., "Dad," "Son"), and so on. Other examples are also contemplated, such as to identify regions of the image 204, such as "upper right," "middle," "lower left," and so forth.

The natural language processing module 116 may then employ both the gesture and the natural language input to initiate an image editing operation. Continuing with the above example, the natural language processing module 116 may identify the image editing operation from the gesture 206 and a subject of the image editing operation from a natural language input, e.g., generated form the audio data 118, manually input by a user, and so on. The natural language processing module 116 may also identify a subject and operation using the reverse in which a gesture identifies the subject and a natural language input specifies the operation, further discussion of which may be found in relation to the following description and associated figure.

Figure 3:
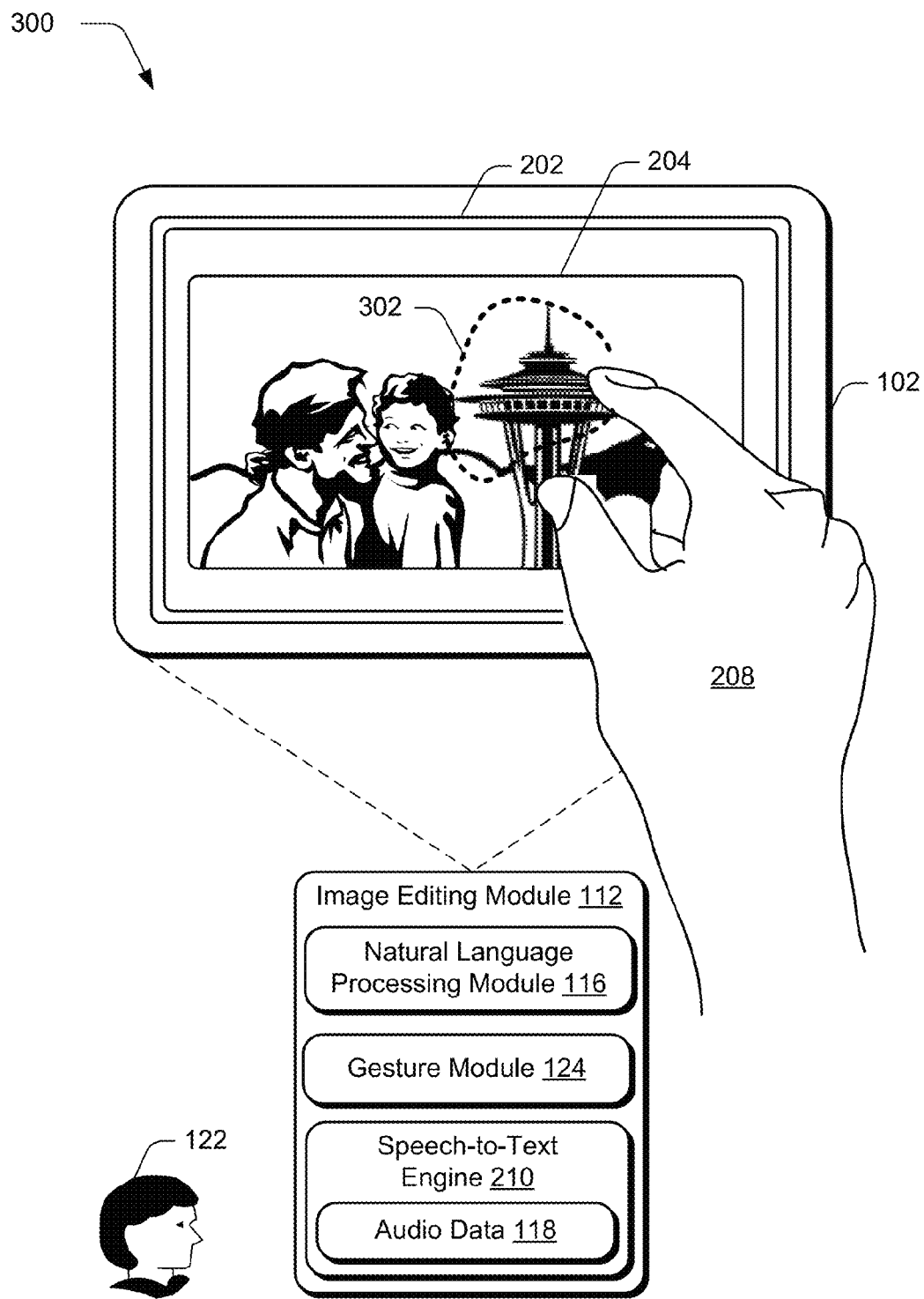
FIG. 3 depicts a system in an implementation in which another example of operation is shown of the natural language processing module and gesture module of the image editing module.

FIG. 3 depicts a system 300 in an example implementation in which another example of operation of the natural language processing module 116 and gesture module 124 of the image editing module 112 is shown. In the previous example of FIG. 2, a gesture was used to specify an operation and a natural language input was used to specify a subject of the operation. In this example, a natural language input is used to specify the operation and a gesture is used to specify a subject of the operation.

A gesture 302, for instance, may be performed as a series of touch inputs as shown in phantom. In this example, the touch inputs define at least part of a boundary of an object included in the image 204, which is the Space Needle in this example. Thus, the gesture 302 defines a subject of an image editing operation.

A natural language input may also be used, but in this instance to identify the image editing operation itself. For example, audio data 118 may be received from a user and processed using a speech-to-text engine 210 as previously described, captured manually, and so on. The natural language input may specify which operation is to be performed on the portion of the image 204 identified by the gesture 302, such as "improve contrast," "deblur," "matt," "make less yellow," and so forth.

As before, the natural language processing module 116 may then initiate performance of an image editing operation based on the natural language input on the portion of the image identified by the gesture 302. In this way, a user may efficiently interact with the image editing module 112 to specify image editing operations in an intuitive manner. Although a gesture 302 made by circling a portion of the image 204 was described in this example, other examples are also contemplated as further discussed below.

Figure 4:
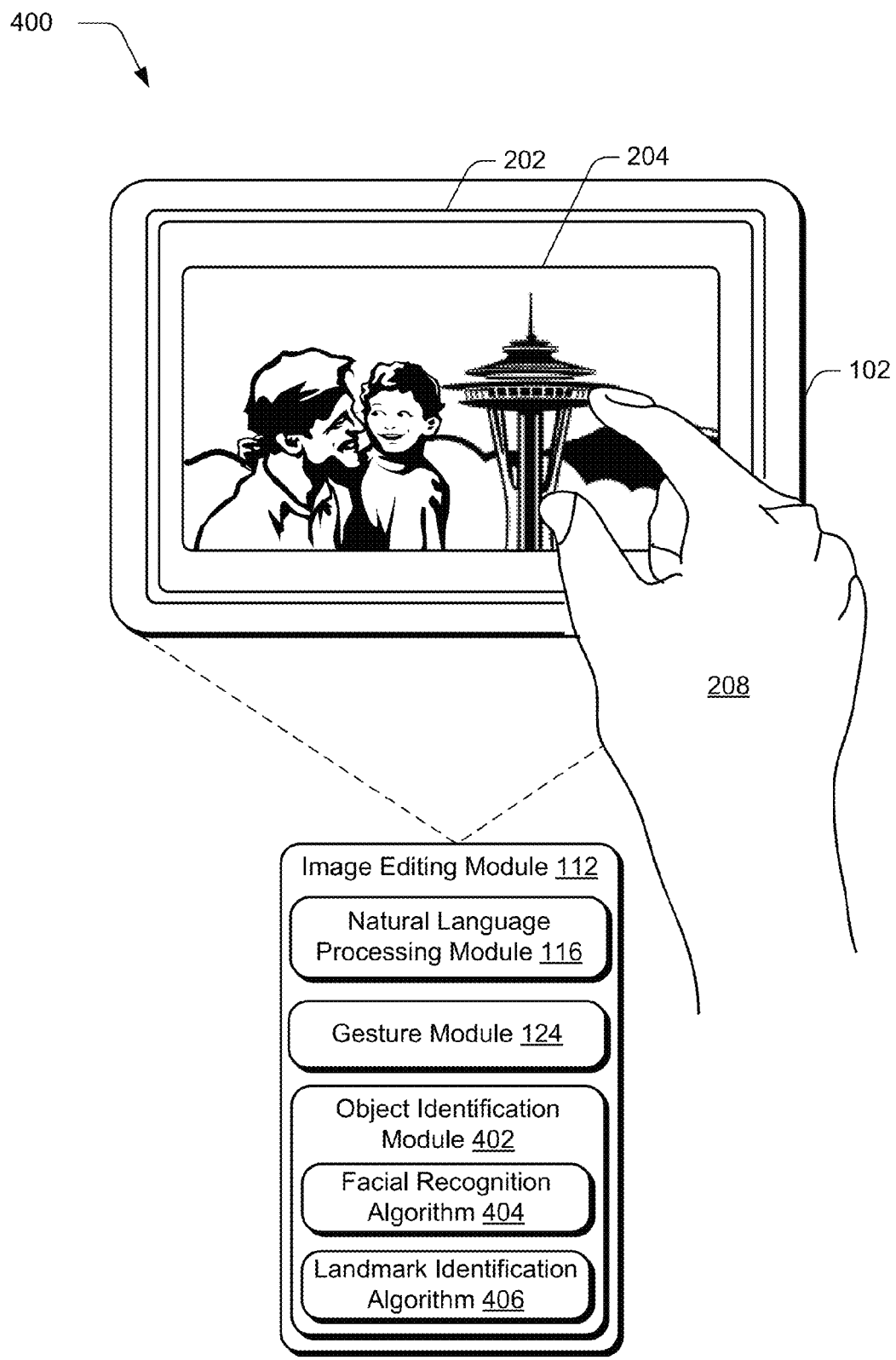
FIG. 4 depicts a system in an implementation in which yet another example of operation is shown of the natural language processing module and gesture module of the image editing module.

FIG. 4 depicts a system 400 in an example implementation in which yet another example of operation of the natural language processing module 116 and gesture module 124 of the image editing module 112 is shown. In the previous example a boundary of an object was defined using a gesture, itself. A gesture may also be used to initiate functionality that may be used to identify a subject of an image editing operation.

A finger of a user's hand 208, for instance, may tap a location of an image 204 displayed by the display device 202. One or more touch sensors of the display device 202 may register this tap. The tap may then be recognized as a gesture by the gesture module 124 to indicate a part of an object that is to be a subject of an image editing operation.

The gesture may then cause operation of an object identification module 402 to identify an object in the image 204 associated with the location of the tap, which may include identification of a boundary of the object in the image 204. The object identification module 402, for instance, may employ one or more facial recognition algorithms 404 to recognize a user in the image 204, such as the "Dad," "Son," and so on responsive to a tap on those portions of the image. By using the facial recognition algorithm 404, boundaries of these people may be determined and used to define a subject of an image editing operation.

In another instance, the object identification module 402 may employ a landmark identification algorithm 306. The landmark identification algorithm 406 may be used to identify geographical and other landmarks that are included in the image 204, such as the Space Needle in the illustrated example. Like before, the landmark identification algorithm 406 may be used to determine boundaries of a subject of an image editing operation. Although use of facial recognition and landmark identification was described, a variety of other techniques may also employed by the object identification module 402 to identify objects that are to be a subject of an image editing operation. Further discussion of these and other techniques involving natural language image editing may be found in the Example Procedures section, which follows a Natural Language Processing section.

Natural Language Processing Example

Figure 5:
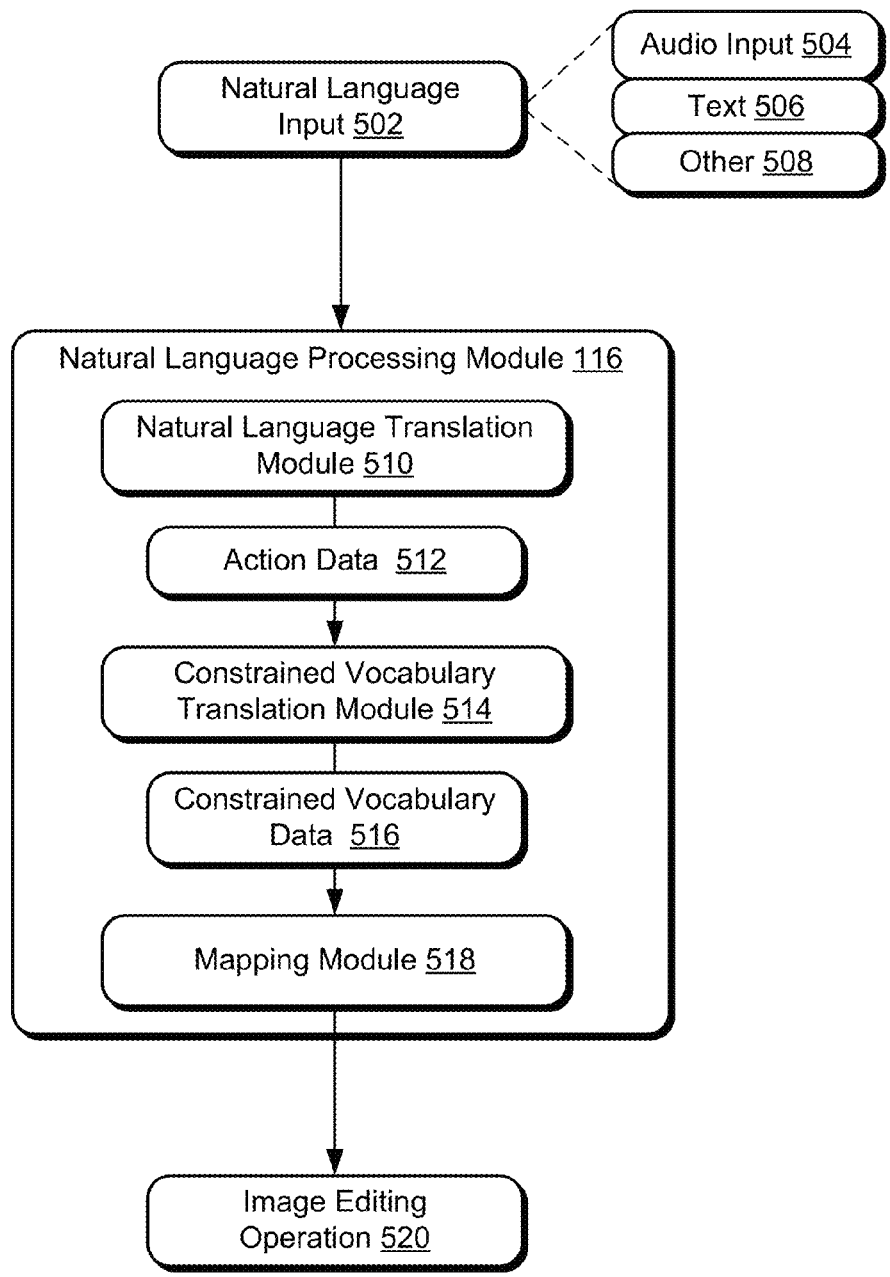
FIG. 5 depicts a system in an example implementation showing a natural language processing module in greater detail.

FIG. 5 depicts a system 500 in an example implementation showing a natural language processing module 116 in greater detail. The natural language processing module 116 is illustrated as including a plurality of sub-modules that are representative of functionality that may be employed by the natural language processing module 116 to process a natural language input 502, such as an audio input 502, text 506, or other 508 form. An utterance (e.g., a sentence) of an audio input 504, for instance, may be translated by a speech-to-text engine 210 as previously described, manually input by a user, and so on.

Regardless of how the natural language input 502 originated, the natural language processing module 116 may employ a natural language translation module 510 to translate a natural language input 502 (e.g., a given sentence) into an expression of a set of operations (also known as filters) which act upon the image or portion of the image of interest as previously described.

This translation may be performed by the natural language translation module 510 by parsing the natural language input 502, thereby breaking it down into action data 512 that references an action to be performed. The action data 512 may include a subject of the action and a set of modifiers for the action and for the subject. At this point the action data 512 includes a set of arbitrary vocabulary verbs, nouns, adjectives and adverbs.

However, the description of the image editing operation may also be expressed by a constrained vocabulary to increase accuracy in determining an operation to be performed. Accordingly, a constrained vocabulary transition module 514 may be employed to translate arbitrary language of the action data 512 into constrained vocabulary data 516. This may include translation of arbitrary verbs into one or more of the constrained vocabulary verbs, an arbitrary subject into one or more of the constrained vocabulary subjects, and so forth to form the constrained vocabulary data 516.

Another component of the natural language processing module 116 is illustrated as a mapping module 518. The mapping module 518 is representative of functionality to express each constrained vocabulary command as a specific image editing operation 520. This may include identification of a specific set of image processing filters and associated parameters which may be expressed in conjunction with the image editing operation 520. Details of mapping from arbitrary sentences to specific image editing operations are described in further detail below.

In the following discussion a convention is adopted in which functions of images are to be interpreted as equivalent functions acting independently on individual pixels in the image. For example, let "I($\vec{r}$)" denote an image with image intensity values specified at each pixel spatial coordinate location "$\vec{r}$." Then, a scalar function "f" operating on the image "f(I)" may be interpreted as an image which has intensity values "f(I($\vec{r}$))" at each location "$\vec{r}$."

Parse Premise

As previously described, the natural language translation module 510 may be utilized to parse a natural language input 502, such as input text. Although an unparsed analysis presents a simple system, this system is typically not suitable for capturing the full subtlety of human language and corresponding intentions. As an example, take the input sentence "the image is too bright", or even simpler, "the image is bright." The expected response of the system is to darken the image and the implied action is the negation of brighten (!Brighten). Compare this with the statement "the image is not bright enough" and "not enough of the image is bright." The two later statements employ the action "brighten" but the first implies a uniform action across the image while the latter implies a spatially localized adjustment. Accordingly, a parsed input may be employed such that a correct interpretation may be assigned in each case.

Parsing may also be used to expand a range of operations that can be described. For example, for a system in which one hundred verbs, subjects, adjectives, and adverbs may be employed, respectively, these set of four hundred terms may potentially describe $100^4$=100 million expressions. Although parsing is described, other implementations are also contemplated, such as to employ a "bag of words" technique insistences in which parsing confidence is low.

Image Processing; Single Filter

A single underlying image processing model can be used for both of two scenarios which are considered in the following discussion:

scenario 1 example: "make the shadows more contrasty in the upper left corner"; and
scenario 2 example: "make the image more contemplative;" or: "make the border of the image more cheerful."

Both scenarios may be implemented with a function (e.g., a filter) which operates on an input image to produce a output image. Various input parameters may be used determine the nature of the filter which is to be applied, the adjustment parameters associated with the filter as well as parameters which describe a mask which localizes the modifications to specific spatial and tonal regions of the image.

Example image processing operations are described by a "localized filter" function which is further detailed below. This function describes use of a composite set of filter functions with respective specified filter parameters along with the localization of the effects by an image mask, generated by a combination of spatial-limiting and tonal range-limiting functions.

Multiple Filters

The following discusses an example in which two filter operations are described. In general, a word (e.g., a term) from the unconstrained vocabulary set may map to a set of filtering operations. For example, the verb "shine" may be mapped to a combination of an increase in brightness and an increase in contrast. "Dazzle" may map to brightness, contrast and vibrance adjustments as well as to a crystallize and edge enhancement filter. Thus, this may involve multiple filtering operations, which are further described below. For example, in a "shine" example that employs two filters, each individual filter has its own set of parameters, "$\vec{\pi}$." In addition, there is a corresponding individual filter blend strength, "$\lambda$," which is used to modulate the filter strength relative to the incoming image "$I_0$."

Let the blend and parameter values for a contrast change be designated by a subscript "2" and for a brightness change by a subscript "1." A contrast filter operation may then be expressed in terms of the more basic (non-blending) contrast filter, "Contrast$_{\vec{\pi}_2}$(I)," as $$\text{Contrast}_{\lambda_2, \vec{\pi}_2}(I) = \text{blend}(I, \text{Contrast}_{\vec{\pi}_2}(I), \lambda_2)$$
$$= (1 - \lambda_2)I + \lambda_2 \text{Contrast}_{\vec{\pi}_2}(I)$$

Thus, the result of the contrast filter acting upon image "I" is a blend of the image itself with the result of the non-blended basic contrast filter operation. When the blend parameter "$\lambda_2$" is zero, the result is the input image itself, and when it has a value of unity the result is that of a basic contrast operation.

Similarly, a brightness filter may be expressed as follows:

$$\text{Brighten}_{\lambda_1, \vec{\pi}_1}(I) = \text{blend}(I, \text{Brighten}_{\vec{\pi}_1}(I), \lambda_1)$$

A basic "shine" filter may then be implemented by consecutively applying the two individual filters yielding the final image "I," as the result of the composite of the two operators (filters) acting upon the incoming (source) image, "$I_0$."

$$I = \text{Contrast}_{\lambda_2, \vec{\pi}_2}(\text{Brighten}_{\lambda_1, \vec{\pi}_1}(I_0))$$

It should be noted that if "$\lambda_2$" is zero then the result reduces to a brightening operation and if "$\lambda_1$" is zero the result reduces to a contrast operation. Also, a particular order is chosen for the basic filtering operations, which in this case brightening is applied first and then followed by application of a contrast operation to the resultant brightened image.

To provide control over the strength of the complete composite operation an additional final blending step may be performed with the modulation parameter "$\lambda_0$" as follows:

$$I = \text{blend}(I_0, \text{Contrast}_{\lambda_2, \vec{\pi}_2}(\text{Brighten}_{\lambda_1, \vec{\pi}_1}(I_0)), \lambda_0)$$

The closer "$\lambda_0$" is to zero the more the final image resembles the original image. Additionally, the closer this parameter is to a value of unity, the more the image approaches the full strength shine operation.

The following shorthand expression may be used for the various compositions, which is as follows:

$$\text{shine}=\text{contrast}_{0.2}\text{brighten}_{0.7}$$

which provides a shorthand notation for the following parameters:

$$\lambda_1=\lambda_0=1$$

$$\pi_1=0.2, \pi_0=0.7$$

In another example, an alternate notation may be used such as:

$$\text{shine}=\text{contrast}\{0.2\}\text{brighten}\{0.7\}$$

In a further example, the following notation may also be utilized:

$$\text{shine}=0.5\text{contrast}_{-3}0.9\text{brighten}_{0.5}$$

which is a shorthand notation for the parameters:
$\lambda_1=0.5, \lambda_0=0.9$
$\pi_1=-3, \pi_0=0.5$ More generally, any non-constrained action (e.g., verb) may be mapped into a composition of basic filters in a similar way.

Multiple Filter Compositions

These techniques may also be employed for a plurality of filters. For example, each filter function may be associated with a set of parameters. Let "F(a)" designate a filter function where the index "a=1, . . . $N_f$" specifies a filter type and "$N_f$" expresses a number of filter function available. Additionally, let "$\vec{\pi}_a$" represent filter parameters (e.g., vectors) associated with filter type "a" and let "$\lambda_a$" designate associated individual filter blending parameters. In one or more implementations, an assumption is made that a particular ordering of filters with higher index filters operates on the lower index filters. According to this assumption, the output image "I" is obtained from a concatenation of the individual filter operations acting upon the input image "$I_0$" as follows:

$$I = \prod_{a=1}^{Nf} F^{(a)}_{\lambda_a, \vec{\pi}_a} I_0$$

where the blended filter operation is formed from the unblended basic filter "$F_{\vec{\pi}_a}$" as follows:

$$F_{\lambda_a, \vec{\pi}_a}^{(a)} I = (1-\lambda_a)I + \lambda_a F_{\vec{\pi}_a}(I)$$

Incorporating a final blending step to control an overall strength with parameter "$\lambda_0$" may yield an expression of any general global (i.e., as in non-local) action as follows:

$$I = \text{blend}\left(I_0, \prod_{a=1}^{Nf} F^{(a)}_{\lambda_a, \vec{\pi}_a} I_0, \lambda_0\right)$$

Incorporation of Tonal and Spatial Localization

Figure 6:
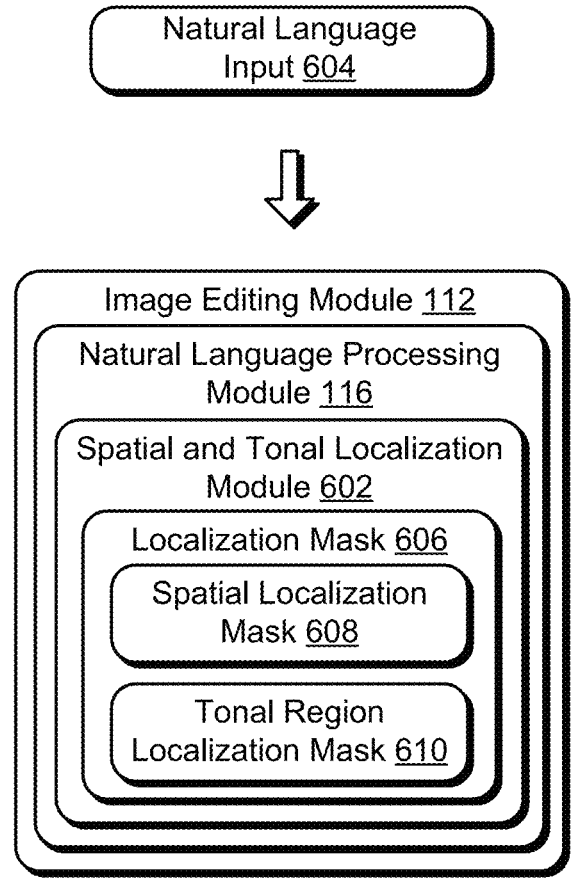
FIG. 6 depicts a system in an example implementation that is configured to support tonal and spatial localization.

FIG. 6 depicts a system 600 in an example implementation that is configured to support tonal and spatial localization. As previously described, application of multiple filters may be used to produce a composite filter which corresponds to an unconstrained verb/action input. For example, a natural language input 604 of "make the image shine a bit" may be interpreted as apply the filter corresponding to:

$$\text{shine}=\text{contrast}_{0.2}+\text{brighten}_{0.7}$$

with an overall strength parameter "$\lambda_0=0.3$," which for the purposes of the following discussion is the associated value of "a bit."

For a subsequent natural language input of "make it shine even more" may be interpreted in a similar way but with a larger strength parameter, e.g., "$\lambda_0=0.6$" with strength ("a bit") set as 0.3 and strength ("even more") set as 0.6. Thus, the strength function may be hand-tuned for a vocabulary by using a set of modifiers and then trained on a fuller set.

Spatial and tonal localization may also be supported, functionality of which is represented in FIG. 6 through inclusion of a spatial and tonal localization module 602 as part of the natural language processing module 116. This may be used to handle utterances such as: "make the image shine a bit here;" "the highlights are too green;" or "increase the contrast in the mid-tones of the bottom right corner" through generation of a localization mask 606.

Although each filter may contain spatial localization information, it may be more efficient in one or more implementations to separate the image adjustment from the effect localization explicitly. This may be performed by replacing the constant strength parameters with a spatially varying mask which may be determined by the set of spatial localization and tonal localization parameters.

This may be performed for each filter independently. For example, a user may wish to brighten the top of the image while enhancing color vibrance of the highlights in the lower left corner. In this case, separate localization masks 606 may be created for the brightening operation and the vibrance operation, respectively. In another example, a single localization mask 606 may be considered for an entire composite filter operation. Multiple composite filters may then be applied step by step as previously described.

For instance, a localization mask "$M_{\vec{\sigma}, \vec{\tau}}(I_0)$" 606 that is a function of the input image may be parameterized by a set of spatial localization parameters "$\vec{\sigma}$" as well as tonal localization parameters "$\vec{\tau}$" The localized composite filtered image may be expressed as:

$$I = \text{blend}\left(I_0, \prod_{a=1}^{Nf} F^{(a)}_{\lambda_a, \vec{\pi}_a} I_0, \lambda_0 M_{\vec{\sigma}, \vec{\tau}}(I_0)\right)$$

$$= (1 - \lambda_0 M_{\vec{\sigma}, \vec{\tau}}(I_0))I_0 + \lambda_0 M_{\vec{\sigma}, \vec{\tau}}(I_0)\prod_{a=1}^{Nf} F^{(a)}_{\lambda_a, \vec{\pi}_a} I_0$$

In the above expression, those image pixels that have mask values of zero cause resultant image values to be produced that are unchanged from the original image. Those pixels which have mask values of unity yield a full composite filtered result, and pixels with mask values between zero and one result in a corresponding blend of the two.

In one or more implementations, a limitation may be made to mask functions that are composed of independent tonal and spatial pieces, an example of which is a simple "screen" combination as follows:

$$M_{\vec{\alpha},\vec{\sigma},\vec{\tau}}(I_0) = \text{screen}(\alpha_{space}M_{\vec{\sigma}},\alpha_{tone}M_{\vec{\tau}}(I_0))$$

where the screen function is defined as:

$$\text{screen}(x_1,x_2) = x_1 + x_2 - x_1 x_2$$

Further, an addition subscript "$\vec{\alpha}$" may be added to reference space and tone amplitudes as follows:

$$\vec{\alpha} = \{\alpha_{space}, \alpha_{tone}\}$$

The localization mask 606 is a combination of a spatial localization mask "$M_{\vec{\sigma}}$" 608 with a tonal region localization mask "$M_{\vec{\tau}}(I_0)$" 610. The latter is dependent upon the image values for determination of the tonal membership of each pixel. The amplitudes "$\alpha_{space}$" and "$\alpha_{tone}$," may be used to control the strengths of the two contributions. Amplitudes may be restricted such that the values lie within a range of values between zero and one and that the sum of the values adds up to unity as well.

$$\alpha_{space} + \alpha_{tone} = 1$$

With the mask factorization included, a final form for the localized composite filtered image may be expressed as follows:

$$I = \text{blend}\left(I_0, \prod_{a=1}^{Nf} F_{\lambda_a,\vec{\pi}_a}^{(a)} I_0, \lambda_0 \text{screen}(\alpha_{space} M_{\vec{\sigma}}, \alpha_{tone} M_{\vec{\tau}}(I_0))\right)$$

Spatial and tonal masks are defined in further detail below.

This function is an expression of a basic image processing action. The function provides for a multi-component composition of filtering operations and also provides for localization of the effects both within a specified spatial domain as well as within a specific tonal range of image values. In other words, the function is sufficiently general to express complex requests, such as "make the image sparkle more in the shadow regions on the left side near here."

Tonal Region Localization Mask

A tonal region localization mask 610 has been described above as a function "generate_tonal_mask." A simple form may also be used and is described herein, although more complex tonal shapes are also contemplated. For example, let the tonal parameters include the following:

$$\vec{\tau} = \{\beta_s, \beta_m, \beta_h, \mu_s, \mu_m, \mu_h\}$$

in which:
$\beta_s$=shadow strength;
$\beta_m$=midtone strength;
$\beta_h$=highlight strength;
$\mu_s$=shadow power;
$\mu_m$=midtone power; and
$\mu_h$=highlight power.

The three strength values may be used to determine which tonal region or regions have the key concentration of emphasis. The powers help modulate the tonal shapes as shown in the following expression:

$$M_{\vec{\tau}}(I_0) = \beta_s[(1-I_0)^2]^{\mu_s} + \beta_m[4I_0(1-I_0)]^{\mu_m} + \beta_h[(I_0)^2]^{\mu_h}$$

For a simpler situation in which each of the powers are unity, this reduces to the following expression:

$$M_{\vec{\tau}}(I_0) = \beta_s(1-I_0)^2 + \beta_m 4I_0(1-I_0) + \beta_h I_0^2$$

It should be noted that in this form the mask reduces to unity (no tonal specificity) for each of the pixels when the three tonal strengths take on values $\{s, m, h\} = \{1, 0.5, 1\}$. A mask that is concentrated exclusively in the shadow regions may be described by the strength parameters $\{1, 0, 0\}$. Similarly, the midtone-exclusive parameters may be expressed as $\{0, 1, 0\}$ and the highlight exclusive parameters may be expressed as $\{0, 0, 1\}$. The power parameters are used to control the specificity of each tonal region. Larger values narrow the tonal extent while smaller values broaden it.

Spatial Localization Mask 608

A spatial mask, which may be tailored to the two specific scenarios described above, may include three spatial components: (1) a Gaussian (or some other shape such as an exponential function) to convey a local operation such as "make it brighter here"; (2) a spatial gradient function to specify operations such as "make the left side greener"; and (3) a border function to enable such descriptions as "make the border more vibrant."

Ignoring the border for the moment, the spatial localization mask 608 can be described as:

$$M'_{\vec{\sigma}} = \text{screen}(\alpha_G G(\vec{r}-\vec{r}_0,\sigma), \alpha_g \text{gradient}(\vec{r},\vec{r}_1,\vec{r}_2,\text{softness}))$$

where the screen function, defined above, combines the effects of the Gaussian function that is expressed as follows:

$$G(\vec{r}-\vec{r}_0,\sigma)$$

and the gradient function that is expressed as follows:

$$\text{gradient}(\vec{r},\vec{r}_1,\vec{r}_2,\text{softness})$$

in a natural way. The two strength parameters "$\alpha_G$" and "$\alpha_g$" may be used control the amplitudes of the two contributions.

In the above expressions, "$\vec{r}_0$" references the Gaussian, e.g., it is a point specified when the user indicates "make it better here." Also, "$\sigma$" is the Gaussian standard deviation parameter that controls the spatial extent of the function. The two coordinates "$\vec{r}_1$" and "$\vec{r}_2$" may be used to determine a direction and extent of a gradient function "softness" to control smoothness near the endpoints of the gradient function.

The following border function may also be added:

$$\text{border}(\vec{r},\text{widths},\text{softness}')$$

This function describes a frame around an image with a specified top, bottom and side widths and with a softness parameter to control a transition from an interior of the image to a border.

Thus, the full spatial localization mask 608 function may be expressed as follows:

$$M_{\vec{\sigma}}(\vec{r}) = \text{screen}(\alpha_b \text{border}(\vec{r},\text{widths},\text{softness}'), M'_{\vec{\sigma}}(\vec{r}))$$

This function is modulated by a border strength parameter "$\alpha_b$."

Defining the three-argument fully symmetric screen function as follows supports writing of a complete spatial mask function:

$$\text{screen}(x_1, x_2, x_3) = \text{screen}(\text{screen}(x_1, x_2), x_3)$$
$$= x_1 + x_2 + x_3 - x_1 x_2 - x_2 x_3 - x_3 x_1 + x_1 x_2 x_3$$

Thus, the complete spatial mask function may be written in a form that hides the full set of parameters as follows:

$$M_{\vec{\sigma}}(\vec{r}) = \text{screen}(\alpha_G G(\vec{r} - \vec{r}_0), \alpha_g \text{gradient}(\vec{r}), \alpha_b \text{border}(\vec{r}))$$

Thus, the spatial localization mask 608 may be configured to capture the three spatial concepts. First, a region localized near a single point. Second, gradients that can describe concepts such as "top," "bottom," "lower left corner," and so on. And third, the image border region is captured.

The full set of spatial mask parameters, partitioned according to the three concepts may therefore be expressed as follows:

$$\vec{\sigma} = \{\{\alpha_G, \vec{r}_0, \sigma\}, \{\alpha_g, \vec{r}_1, \vec{r}_2, \text{softness}\}, \{\alpha_b, \text{widths}, \text{softness}'\}\}$$

Sentence Forms

At this point in the discussion, each of the pieces have been presented that support production of a well-determined composite filter that is spatially and tonally localized and that corresponds to a sentence whose form follows a specified framework. In the following discussion, the following two sentence forms are addressed:

Declarative; and
"the left side is too hot";
"the border could be more ragged"; and
"this is my cat";
Imperative:
"make the midtones more interesting";
"deepen the shadows below here"; and
"rank it a three."

Both sentence forms may be reduced to an action (e.g., verb, adverbs) and complement, e.g., noun, adjectives.

In the following discussion, each component (e.g., part of utterance) is mapped (as indicated by the symbol →) to a portion of the composite localized filtering. The following expressions are also used in the discussion:

action→set of filter blend parameters for each possible component filter, $\{\lambda_a\}_{a=1 \ldots N_f}$
adverbs→filter parameters, $\{\vec{\pi}_a\}_{a=1 \ldots N_f}$
complement→mask spatial and tonal localization parameters, $\lambda_0, \alpha_{space}, \alpha_{tone}, \vec{\sigma}, \vec{\tau}$ Action Set The action set that is considered available in the following discussion corresponds to a set of image processing filters that are enabled. The following describes an example of an initial set, which may be labeled with numbers "0" to "$N_f$" that are usable to index the corresponding filter functions, as described above.
brighten;
add_contrast;
add_red;
add_green;
add_blue;
add_cyan;
add_magenta;
add_yellow;
add_black;
add_warmth;
add_coolness;
add_vibrance;
desaturate;
make_black_and_white;
make_sepia;
make_blue_tint;
blur;
sharpen;
solarize;
emboss;
crystallize;
pointillize;
. . .
zoom_in;
zoom_out; and
rotate.

Adverb Set

The following includes examples of action modifiers:
slightly_more;
more;
much_more;
slightly_less;
less;
much_less;
redder;
bluer;
greener;
cyan_er;
magenta_er;
yellow_er; and
blacker.

Complement Phrase Set

The following includes a simple set of forms for the phrase which describes the tonal and spatial localization, with color localization also added. The complement phrase set localizes the region of the image which is to be affected by the filters. Hence, "L" may be used to indicate this set of (L)ocalization word phrases, which may include various combinations of (S)patial localization terms, (T)onal range terms, (C)olor range terms and modifiers for each of these.

The localization term set may include various combinations of these basic terms:
L={S,T,C,TS,CS,CT}
where the basic terms are exemplified as follows:
S, e.g., "here" or "right side" or "middle" or "upper left corner";
T, e.g., "shadows" or "bright areas";
C, e.g., "reds" or "yellows";
T S, e.g., "shadows in the middle";
C S, e.g., "reds at top";
C T; e.g., "greens in the highlights"; and
C T S, e.g., "yellows in the midtones at the left side."

Each of the terms, S, T, and C may occur with or without (m)odifiers, examples of which are described as follows:
mS;
mT;
mS T;
S m'T;
mS m' T;
e; and so on.

Examples included in the (S)pace localization set include the following:
S;
here1 (e.g., an x,y coordinate pair);

here2 (e.g., a pair of x,y coordinate values which specify a gradient);
left side;
top side;
right side;
bottom side;
upper left;
upper right;
lower left;
lower right;
center; and
border.

Examples included in the (T)onal set include the following:
T;
shadows;
midtones; and
highlights.

Additionally, levels of proximity modification may be supported, e.g., three levels such as tight, medium, and loose.
Examples in the (C)olor set include the following:
C;
reds;
greens;
blues;
cyans;
magentas;
yellows; and
blacks.

For example, the commands "make the highlights darker near here," "make the highlights darker here," and "make the highlights darker around here" may be translated identically with varying modifiers which are tight, medium and loose respectively as following the above examples.

Additionally, tonal and spatial modifiers may be expressed through refinement sentences such as "make the highlights darker here," "tighten it up," and "broaden the highlights a bit." The first phrase may be interpreted as "darken highlights (medium Here)" operation. The second phrase may modify this to "darken highlights (tight Here)" operation and the third phrase may yield a "darken (loose Highlights) (tight Here)" operation. These refinement sentences may be considered a cluster. For each cluster of phrases, a state of the interpretation may be maintained with the state modified as directed.

In one or more implementations, the techniques described herein may be implemented as a system that employs a display of a user interface via which a user can control the various parameters directly without adding modifiers or additional refinement sentences. However, this may not be limited to possibilities of a single one of these modalities. Accordingly, both sentence refinement and user interaction may be enabled as possibilities with an option provided to a user of the image editing system to use one or more modalities as desired.

For example, consider a phrase having the form "slightly brighten the shadows on the left side." This phrase may be parsed by the natural language translation module 510 into action data 512 that includes an action "brighten," adverb "slightly," tone "shadows" and location "on left side." The constrained vocabulary translation module 514 may thereafter convert the action data 512 into constrained vocabulary data 516 as follows:
Action=brighten;
Action_strength=slightly;
Tonal region=shadows; and
Spatial region=left side.

The constrained vocabulary data 516 may then be mapped by the mapping module 518 into an image editing operation 520 which may include setting function parameters.

General Vocabulary

Figure 7:
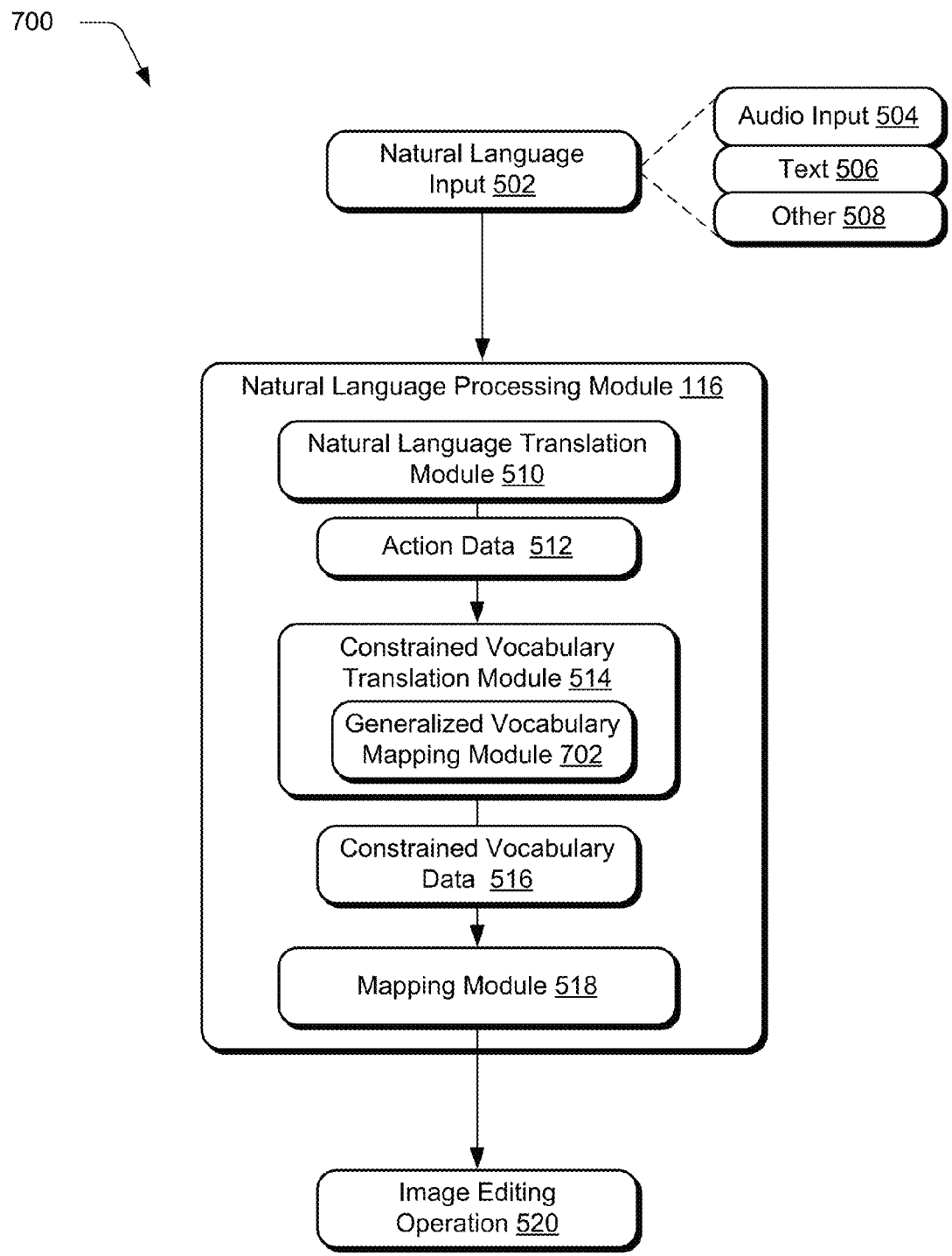
FIG. 7 depicts a system showing a natural language processing module of FIG. 5 as being configured to address a generalized vocabulary.

FIG. 7 depicts a system 700 showing the natural language processing module 116 of FIG. 5 as being configured to address a generalized vocabulary. Although a limited vocabulary system is described above by way of example, other examples are also contemplated. For example, the above system may also serve as a basis for a generalized system that incorporates a generalized vocabulary.

For example, the phrase "make the dark stuff on the left side shine" may be received as a natural language input 502. This phrase may be parsed into an action "shine," tone "dark stuff," and location "left side."

In this example, "shine" is not part of a basis set of limited vocabulary verbs. Hence, a generalized vocabulary mapping module 402 may be employed to determine how (and how much) "shine" corresponds to each of the basis actions included in the set. Similar functionality may also be utilized to determine a corresponding meaning for "dark stuff". The following operations may then be ascertained from the phrase:
shine=add_contrast$_{0.3}$ brighten$_{0.7}$; and
dark stuff=0.8 shadows+0.2 midtones.

The specifics may be refined through training. The interpretation of the above expression may be performed as follows. Two filters are applied consecutively, first a brightening by a brighten increase parameter amount of 0.7 and then a contrast increase by a contrast increase parameter amount of 0.3. Likewise "dark stuff" may be interpreted by assigning to a tonal mask a shadow amplitude of 0.8, a midtone amplitude of 0.2 and an understood highlight amplitude of 0. For filters which take more than one input parameter, a full set of parameters are specified for each term in the mapping.

As another example, a phrase "sparkle up the bright areas" may be received as a natural language input 502. This phrase includes an action "sparkle up" and a complement "dark stuff" Again, generalized vocabulary mapping may be performed by the generalized vocabulary mapping module 702 to determine the following:
sparkle up=add_vibrance$_{0.3}$; add_contrast$_{0.3}$; and brighten$_{0.4}$; and
bright areas=highlights.

Accordingly, the system may employ a basis set of vocabulary for the subjects, verbs, objects, adjectives and adverbs. These in turn may be used to directly drive the parameter settings for image editing operations. The mappings from arbitrary subject or arbitrary verbs, and so on may be manually specified for an initial set of phrases (e.g., words) and then refined and extended to a full range of vocabulary through training. In this way, a sentence of the specified type may be mapped to a meaningful basis sentence which directly drives the image processing. A schematic of the system may be expressed as follows:
General Vocabulary<--> Basis Terms <--> Basis function parameters;
Complement;
Actions; and
Adverbs.

The following includes a few example mappings from general to limited basis vocabulary which is provided as an illustration of the possibilities:
make darker=brighten$_{-1}$;
dim=brighten$_{-0.5}$;

make sad=desaturate$_{0.3}$, add_contrast$_{-0.3}$, and brighten$_{-0.4}$;
make mysterious=add_contrast$_{+0.3}$ and brighten$_{-0.6}$;
make happy=add_vibrance$_{+}$0.3, add_contrast$_{+0.2}$, and brighten$_{+0.5}$;
sparkle=add_vibrance$_{+0.5}$, add_contrast$_{+0.3}$, and brighten$_{+0.2}$;
shine=add_contrast$_{+0.3}$ and brighten$_{+0.7}$;
make old=sepia_tint$_{0.8}$, add_vibrance$_{-0.2}$, and add_contrast$_{+0.2}$;
destroy=blur$_{10}$ and sepia_tint$_{0.5}$;
add oomph=add_vibrance$_{+0.3}$, add_contrast$_{+0.4}$;
top=top_side;
upper=top_side; and
above=top_side.

The following includes declarative input sentence examples:
The highlights in the upper right are slightly too magenta.
The left side is too bright.
The highlights are over-exposed.
The photo is too dark.
It's too saturated.
The colors are too dull.
It's too bright.
It's still too dark.
It needs more color here.
The highlights could be toned down a good bit.
In the following examples, <color> implies an actual color mentioned by the user, e.g., reds, blues, magentas, and so on.
The <colors> are dull.
The <color> is dull.
The <color> is too bright.
The following includes labeling examples:
This is Sam.
This is the sky.
Label this as Mary.
Here is Mary.
Tag this building.
The following includes rating examples:
Good;
Mediocre;
This is one of my top choices;
Rate this good; and
Rank this as number 3.
The following includes imperative input phrase examples:
Make the border spookier but not so ragged;
Give a bit more contrast to the dark parts on the bottom;
Make the reds deeper;
Make the shadows greener;
Desaturate the shadows;
Brighten the middle;
Decrease the contrast by ten percent;
Brighten the image a bit;
Make the image cooler (warmer);
Warm up the colors;
Darken the top;
The top of the image is too bright;
The top is over-exposed;
It's too bright at the top;
I can't see the detail at the top of the image!;
Dodge the image top;
Lighten the left side;
Make the colors pop;
Make the colors vibrant;
Make the colors more vibrant;
Make the <color> brighter;
Make the <color> more/less saturated;
Make the <color> darker;
Increase the saturation by <number>;
Decrease the saturation by <number>;
Increase the <color> saturation by <number>;
Decrease the <color> saturation by <number>;
Increase the <color> lightness by <number>;
Decrease the <color> lightness by <number>;
Make the border happier;
Spritz up the border; and
Widen the lower border.

The following imperative examples include zooming phrases without a reference point:
zoom in;
magnify;
magnify the image;
make the image bigger;
make it bigger;
smaller;
not so big;
that's too big;
fill the screen;
fit the image to the screen;
fit to the screen;
show me the pixels;
where's the pixel?;
I can't see the detail very well!;
can you zoom in a bit?; and
blow it up a bit.

The following includes examples of questions:
Can you add oomph to the image?
Could you make it sharper towards the top?

Sentence Forms

The following includes examples as a non-exhaustive list of phrases cast into a set of possible sentence forms. The abstract variables indicate (L)ocalization, (A)ction and X for a quantitative description of amounts.

In a first instance, a phrase "L is too A" is shown. For example, for a phrase "the highlights near here are too bright", "L" equates to "highlights" and "A" equates to "brighten." In another example, for a phrase "the reds are too green" "L" equates to "reds" and "A" equates to "add_green." It should be noted that expressions such as these force a negation of the action verb. In other words, the intended effect is to darken the image or to make it less green for the above two examples.

A second instance involves a form "Make L A." In a first such example phrase, "make the left side more colorful" "L" equates to "left side" and "A" equates to "more colorful", e.g., add color vibrance or saturation.

A third instance involves a form "L A." In a first such example phrase "the highlights are over-exposed" "L" equates to "highlights" and "A" equates to "add exposure."

A fourth instance involves a form "A L." In a first such example phrase "warm up the cool colors" "L" equates to "cool colors" and "A" equates to "warm up." In a second such example phrase "desaturate the shadows in the upper right corner" "L" equates to "shadows in upper right corner" and "A" equates to "warm up."

A fifth instance involves a form "L needs to be A." In one such example phrase "the blues need to be enhanced" "L" equates to "blues" and "A" equates to "enhanced."

A sixth instance involves a form "L is not A enough." In one such example phrase "this [location] is not contrasty enough" "L" equates to "here1" and "A" equates to "add_contrast."

A seventh instance involves a form "increase A in L by X." In one such example phrase "increase the brightness in the midtones by 10 percent" "L" equates to "midtones" and "A" equates to "brighten" and "X" equates to ten percent.

An eighth instance involves a form "decrease A in L by X." In one such example phrase "decrease the contrast in the midtones a bit" "L" equates to "midtones," "A" equates to "add contrast" and "X" equates to "a bit." A ninth instances involves a form "It's too A." Example phrases include "it's too dark," "it's too hard to see," "it's too over-exposed," and "it's too dull."

Figure 8:
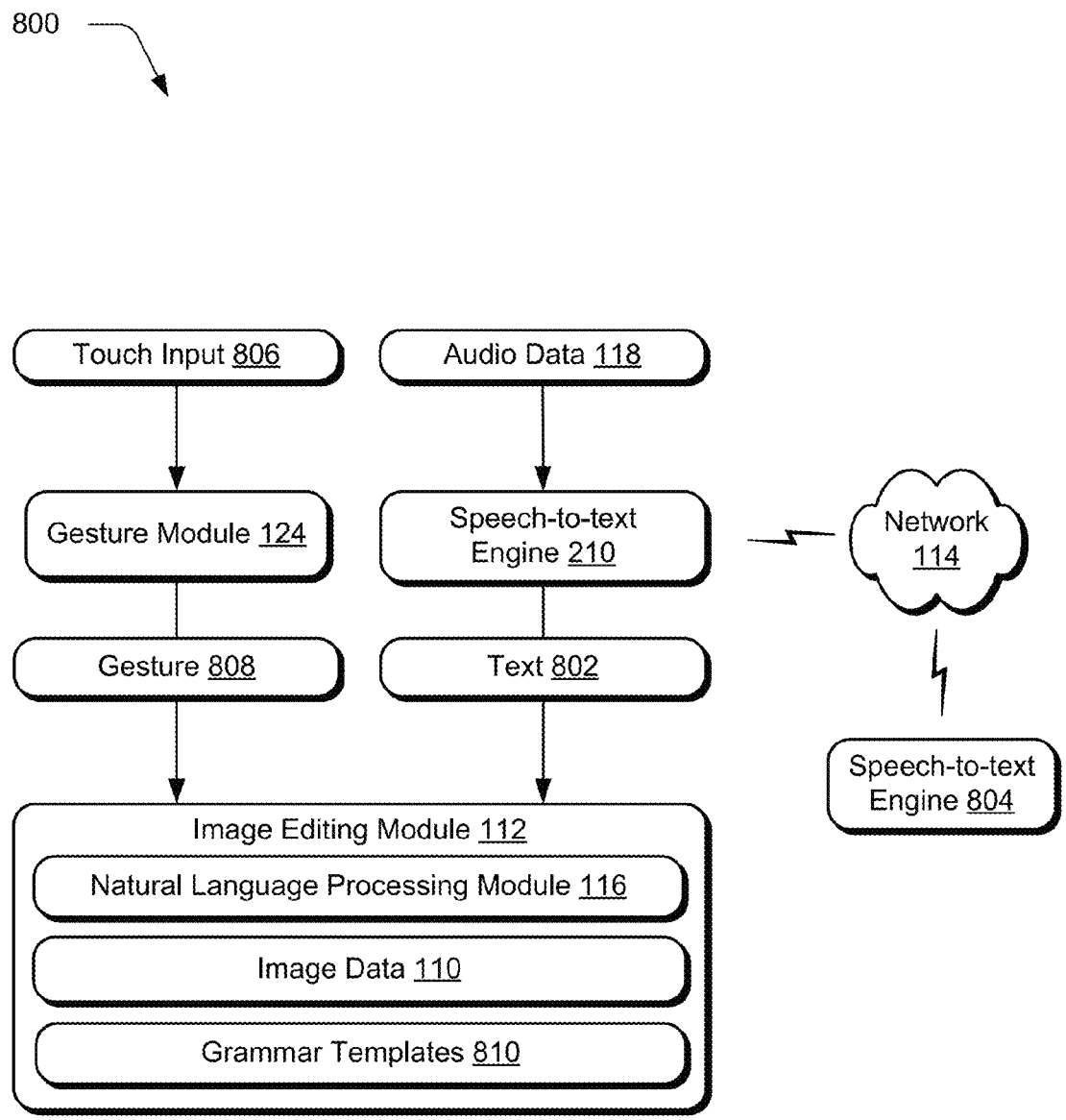
FIG. 8 depicts a system in an example implementation in which a gesture and a natural language input formed from audio data is used to initiate an image editing operation.

Combination of Natural Language Input with User Gestures to Determine Image-Editing Steps FIG. 8 depicts a system 800 in an example implementation in which a gesture and a natural language input formed from audio data is used to initiate an image editing operation. In this example, audio data 118 is converted to text 802 using a speech-to-text engine 210 which may be executed on the computing device 102 of FIG. 1. Another speech-to-text engine 804 may also be employed. For example, the speech-to-text engine 210 may be used initially to attempt translation of the audio data 118 using a finite set of words. The other speech-to-text engine 804 may be made available as a web service via a network 114 and employed to perform speech recognition for portions of the audio data 118 that were interpreted by the speech-to-text engine 210 that have a confidence value below a predefined threshold.

A touch input 508 is received and recognized as a gesture 808 by the gesture module 124 as implemented by the computing device 102 of FIG. 1. The gesture module 124 may be implemented in a variety of ways, such as part of an operating system of the computing device, which may then expose the gesture 808 via an API, as a stand-alone module, part of the natural language processing module 116, image editing module 112, and so on.

The gesture module 124, for instance, may recognize a panning gesture and expose this gesture to the natural language processing module 116 of the image editing module 112. The natural language processing module 116 may then invoke an operation for drawing in the image data 110, such as at a canvas layer of a user interface of the image editing module 112. In another instance, a pinching gesture may be recognized and used to modify geometric properties of a canvas layer of the user interface or an image, e.g., scaling.

In one or more implementations, touch points detected within a gesture are stored throughout the duration of an "operation set." An operation set involves a demarcation between one image operation to the next. The stored touch points may be used to support a variety of different functionality. For example, the touch points are used as paths for a Bezier curve, which may then be used as a mask for an operation performed by the image editing module 112. Touch points may also be used to determine an arbitrary "bounding box" or anchor points. This information may then be used for operations such as cropping, resizing, scaling, skewing, and more complex affine transformations. Touch points may also be used to determine if a "line" was drawn (using linear regression). Detected lines may then be used for operations such as creating gradients.

Text 802 may be parsed into parts-of-speech as previously described using a natural language translation module 510. The parts-of-speech may then be matched against a set of grammar templates 810. The grammar templates 810 may be structured in such a way that elements of the template correspond to a particular class of operations or parameters. For example, for "Make $NOUN_EXPRESSION $ADJECTIVE_EXPRESSION," the template element "$NOUN_EXPRESSION" is mapped to a class of masks (e.g., spatial mask, tonal mask, objects within the image), and $ADJECTIVE_EXPRESSION is mapped to a class of image operations, e.g., brighter, sharper, and so on. Examples of phrases that match this template include "Make the image blurry", "Make the shadows darker," and "Make the top warmer." Examples of phrases that do not match this template include "Apply brightness to the image," "Make brightness to the right," and "Make bright the left."

Each of the matching grammar templates 810 is returned and the first one is picked. A scoring mechanism maybe used to break a tie or to find the optimal result. The variables of the matching template are then mapped to corresponding operations and parameters. For example, for a phrase "make the shadows on the left slightly brighter" the matched template is "Make $NOUN_EXPRESSION $ADJECTIVE_EXPRESSION." The mapping correspondence is "$NOUN_EXPRESSION=> look for masks" and "$ADJECTIVE_EXPRESSION=> look for operations and parameters." Accordingly, the resulting mapping is "image operation: bright," "masks: shadows+left," and "parameter: slight."

In another example, for a phrase "Slightly Sharpen the image" the matched template is "$VERB_EXPRESSION $NOUN_EXPRESSION" and mapping correspondence is "$VERB_EXPRESSION=> look for operations and parameters" and "$NOUN_EXPRESSION=> look for masks." Therefore, the resulting mapping is "image operation: "sharpen," "masks: none" (e.g., "the image" is considered global), and "parameter: slight."

In a further example, for a phrase "increase the warmth of the shadows" the matched template is "$VERB_EXPRESSION $NOUN_EXPRESSION1 $NOUN_EXPRESSION2." The mapping correspondence is "$VERB_EXPRESSION=> look for parameter," "$NOUN_EXPRESSION1=> look for operations," and "$NOUN_EXPRESSION2=> look for masks."Accordingly, the resulting mapping is "image operation: warm," "masks: shadow," and "parameter: increase."

In some cases, a gesture 808 may be combined with text 802 to produce a mapping. For example, for a phrase "blur this" the matched template may be "$VERB_EXPRESSION $DETERMINER." The mapping correspondence is "$VERB_EXPRESSION=> look for operations" and "$DETERMINER=> look for masks." The resulting mapping then involves an "image operation: blur" and "masks: this," which represents a gesture 808, such as a mask drawn in the canvas layer, or the data derived from the collected touch points. The final mapping represents the complete image operation request, and is then processed through an execution engine of the image editing module 112.

Natural Language Image Editing of Tonal and Spatial Image Regions

The discussion will now return again to FIG. 3. As before, an image 204 is displayed on a display device 202 of a computing device 102. Masks may be used to localize an image editing operation. For example, for spatial regions masks may be automatically calculated for geometric spatial regions such as "top", "left", "right", "bottom," and so on that are identified from text, such as text translated form audio data 118 captured from a user 122. These masks can be combined ("upper left", "lower right") using specific image blend modes.

In another example, masks for objects within an image are determined using image object detection, such as to use face detection, landmark detection such as "Space Needle," and so on. In a further example, a gesture detected by the gesture module 124 may be leveraged, such as a circling 302 of the Space Needle in the illustrated example.

Masks for shadows, midtones, and highlights may be calculated by the natural language processing module 116 of the image editing module 112 using one or more algorithms that map the intensity of each pixel to a corresponding "tone membership." Additionally, multiple tonal region masks may be combined using specific image blend modes. And further, tonal masks and spatial masks may be blended together to form the final mask.

Natural Language with Spatial Gestures to Set and Modify Named References (Tags)

In this example, tags (e.g., named references) are set and used to invoke operations that fall within a specific class of sentence patterns, such as "This is $PROPER_NOUN"=>"This is Sara" and "This is $COMMON_NOUN"=>"This is a tree." This may be performed in a variety of ways. For example, object detection may be used by the gesture module 124 to find an object associated within a bounding box that falls within a neighborhood of a pointed region, e.g., a tap, press of a finger of the user's hand 210, and so on. Face detection may also be used to detect faces. The bounding boxes of the objects may then be stored in system memory, and a captured noun used as the identifier to store the reference. Gestures may also be used to set references to arbitrary selections. The set of each of the touch points for a particular gesture are stored in system memory, and the captured noun may then be used as the identifier to store the arbitrary object reference.

Named references may then be retrieved by the natural language processing module 116. For example, the natural language processing module 116 may check uttered phrases for an occurrence of a previously stored object reference. Upon finding a matching object reference, data associated with the reference may be used to populate an appropriate mask. For example, for a phrase "add exposure on Sara" the noun "Sara" is used as an identifier and the natural language processing module 116 checks if a previous reference to Sara was stored. If found, the data associated with that reference is used to populate a mask.

Additionally, more than one object reference may be included within an uttered phrase. In this case, the masks for each of the matched object references are blended together. For example, for a phrase "adjust the hue on Sara and John" the mask for object reference "Sara" and the mask for object reference "John" are blended together to form one mask. Additionally, the masks for objects references may be blended together with tonal masks to form a final mask Natural Language Image Editing Using Arbitrary Vocabulary with Determined Sentence Patterns; Learning of Sentence Patterns from Text For a given phrase, arbitrary words may be detected using the structure of grammar templates 810 as mentioned above. For instance, if an adjective in a grammar template 810 corresponds to an operation, then an unknown adjective within a template's sentence expression is matched against the natural language processing module's 116 set of known operation terms. Additionally, arbitrary terms are matched against known terms to find the closest related term using a term distance formula.

For a dictionary of known terms, each operation has a set of "base terms" that encapsulates an approximate semantic meaning of the operation. There may be three base terms for each image operation: (1) noun term, (2) verb term, and (3) adjective term. These terms may be based on WordNet definitions or other lexical database for English or other languages. For example, for a brightness operation example the following definitions may be employed, such as a "noun term: brightness.n.1," "verb term: brighten.v.1," and "adjective term: bright.a.1." For a vibrance operation example the following definitions may be employed, such as "noun Term: energy.n.4," "verb term: stiumulate.v.4," and "adjective: vibrant.a.3." In a further example, for an un-sharp mask operation example the following definitions may be employed such as "noun Term: sharpness.n.5," "verb term: sharpen.v.4," and "adjective: sharp.a.1."

When an arbitrary term is detected, a part-of-speech tag for that term may be used to compare it with similar base terms for the known operations. For example, for a phrase "make the image heavenly" an unknown term "heavenly" is identified as an adjective and may be matched against "bright.a.1," "vibrant.a.3," "sharp.a.1," and so on.

In another example, for a phrase "glorify the image" the know term "glorify" is identified as a verb and may be matched against "brighten.v.1," "stimulate.v.4," "sharpen.v.4," and so on.

In a further example, for a phrase "add some sparkle to the image" the unknown term "sparkle" is identified as a noun and matched against "brightness.n.1," "energy.n.4," "sharpness.n.5," and so on.

The matching of arbitrary vocabulary terms with the specified set of base terms may then be carried out by producing a measure of closeness between two terms. This measure may then be used to rank the choices, e.g., in which the base term that has the smallest distance to the input term, respectively, is chosen.

A term may also be mapped to more than one operation. For example, in the case of "make the image heavenly," if the distance measures between the term "heavenly" and the base terms "brighten," "add vibrance," and "add soft focus" are 0.4, 0.3, 0.5 respectively, then the normalized distances 0.4/1.2, 0.3/1.2 and 0.5/1.2 may be used to apply each of the operations consecutively with a blending strength proportional to these normalized distances. A variety of other examples are also contemplated without departing from the spirit and scope thereof.

Example Procedures

The following discussion describes natural language techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the previous figures.

Figure 9:
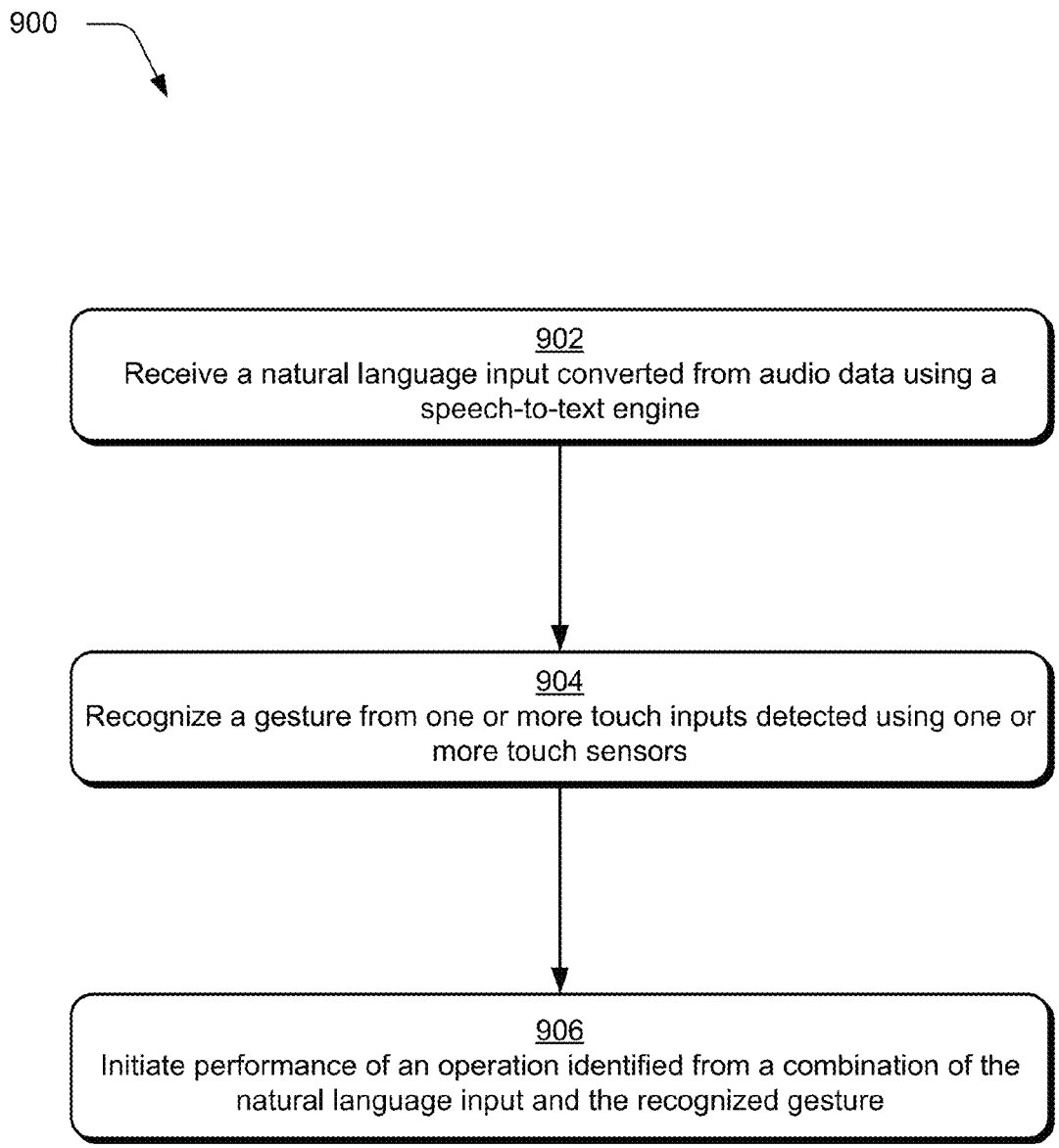
FIG. 9 is a flow diagram depicting a procedure in an example implementation in which a natural language input converted using a speech-to-text engine and a gesture is utilized to initiate performance of an operation.

FIG. 9 depicts a procedure 900 in an example implementation in which a natural language input converted using a speech-to-text engine and a gesture are utilized to initiate performance of an operation. A natural language input is converted from audio data using a speech-to-text engine (block 902). The audio data, for instance, may be captured from a user 122 using an audio capture device 120.

A gesture is recognized from one or more touch inputs detected using one or more touch sensors (block 904). The touch sensors may be implemented as part of a track pad, touch sensors of a display device, and so on. A gesture may then be recognized by a gesture module 124 from the inputs. For example, the gesture may relate to an image, a portion of an image, and so on. This may include defining a boundary around at least a portion of the image as shown in FIG. 3, identification (e.g., a tap) and subsequent processing by an object identification module 402, and so forth.

Performance is initiated of an operation identified from a combination of the natural language input and the recognized gesture (block 906). Continuing with the previous example, the natural language input may specify an operation and the gesture specify a subject of performance of the operation, e.g., circling the Space Needle in the image 204 of FIG. 2 along with a speech input of "make darker." In another example, the gesture may specify the operation (e.g., "contrast") and the natural language input may specify a subject of the operation as shown in FIG. 2. A variety of other examples are also contemplated, such as to specify a degree of performance of the operation using the gesture and/or a natural language input.

Figure 10:
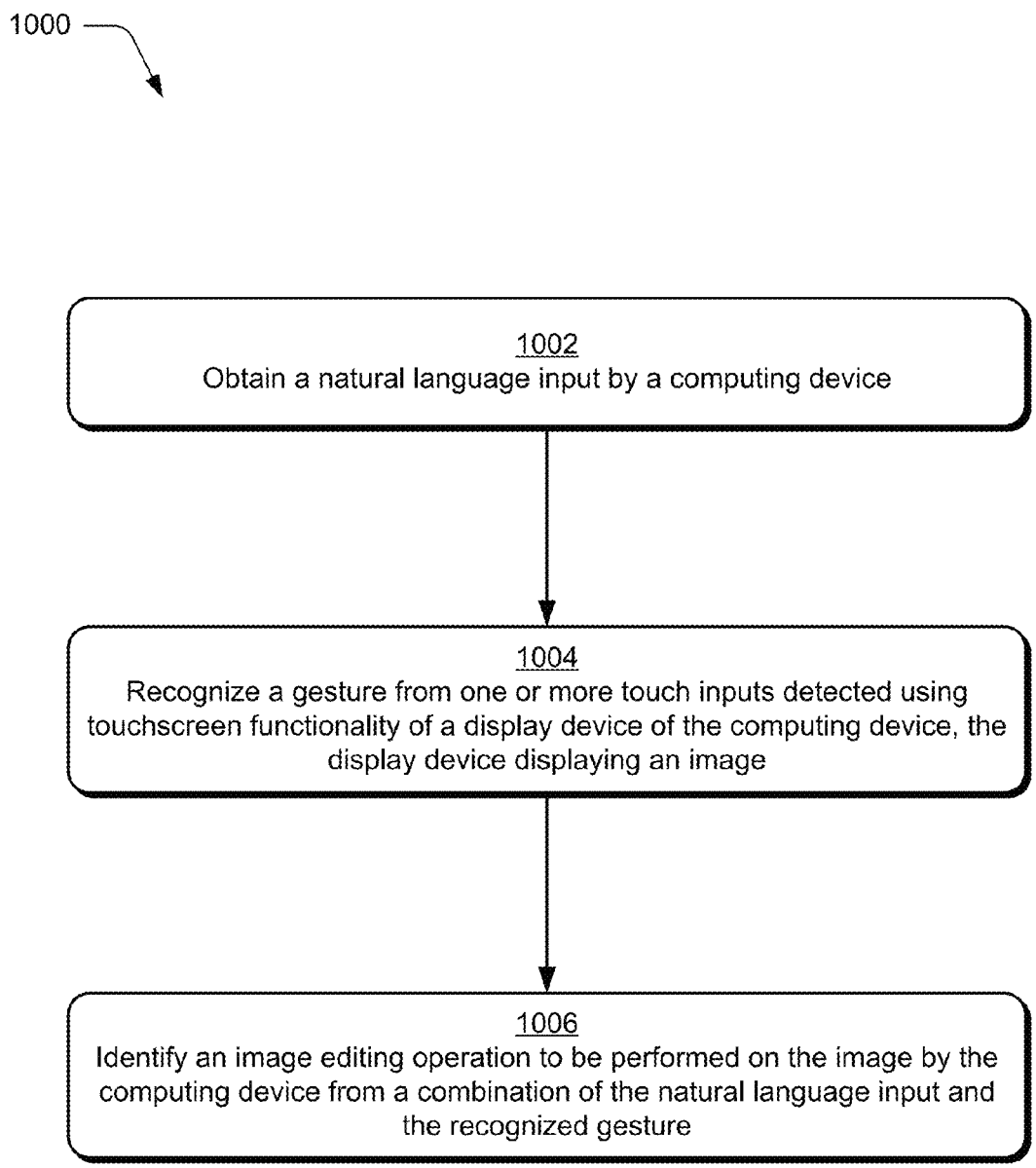
FIG. 10 is a flow diagram depicting a procedure in an example implementation in which a natural language input and gesture are utilized to initiate performance of an image editing operation.

FIG. 10 depicts a procedure 1000 in an example implementation in which a combination of natural language input and gesture is utilized to initiate performance of an image editing operation. A natural language input is obtained by a computing device (block 1002). This may be performed in a variety of ways, such as through manual entry (e.g., drawing, typing) of the text, translation of audio data 118, and so forth.

A gesture is recognized from one or more touch inputs detected using touchscreen functionality of a display device of the computing device, the display device displaying an image (block 1004). As shown in FIGS. 2 and 3, for instance, the computing device 102 may be configured to support a hand-held form factor. A display device 202 of the computing device 102 may include touchscreen functionality to detect touch inputs, which may then be recognized as a gesture by a gesture module 124.

An image editing operation is identified to be performed on the image by the computing device from a combination of the natural language input and the recognized gesture (block 1006). The gesture, for instance, may identify a subject of an operation (e.g., by circling the Space Needle, tap, and so on) and the natural language input the operation to be performed, e.g., "make lighter." In another instance, the natural language input may specify the subject (e.g., "the Space Needle") and the gesture the operation, e.g., "contrast" as shown in FIG. 2. As previously described, additional examples are also contemplated, such as to specify a strength of the operation and so on.

Figure 11:
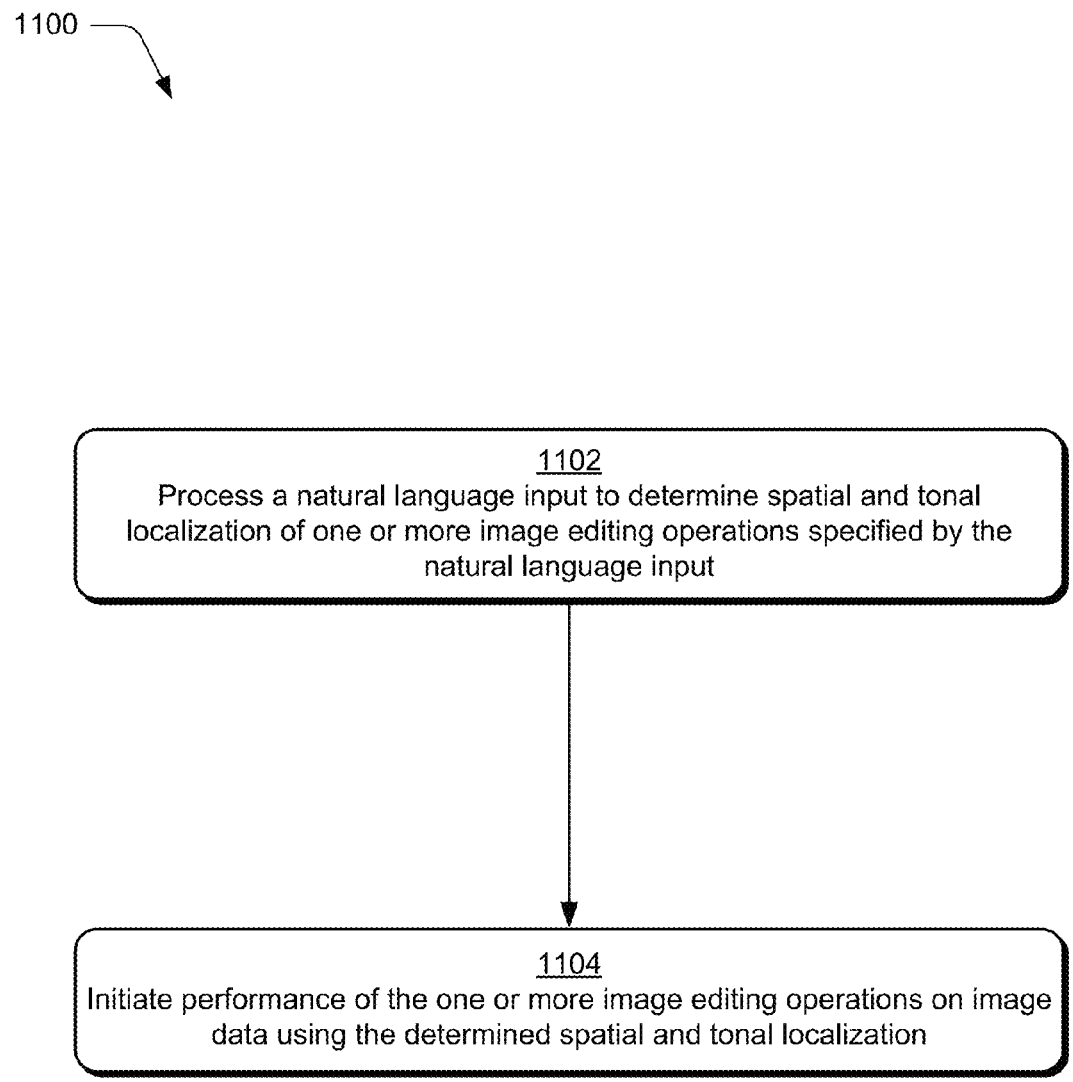
FIG. 11 is a flow diagram depicting a procedure in an example implementation in which a natural language input is processed to determine spatial and tonal localization that is used to perform an image editing operation.

FIG. 11 depicts a procedure 1100 in an example implementation in which a natural language input is processed to determine spatial and tonal localization that is used to perform an image editing operation. A natural language input is processed to determine spatial and tonal localization of one or more image editing operations specified by the natural language input (block 1102). The natural language input, for instance, may reference spatial and tonal range limiting functions that may be used to perform an image editing operation.

Performance is initiated of the one or more image editing operations on image data using the determined spatial and tonal localization (block 1104). This may include generation of localization mask that includes a spatial localization mask and a tonal localization mask to perform the image editing operations. The localization mask, for instance, may be a function of image data and parameterized by a set of spatial localization parameters as well as tonal localization parameters, an example of which is described as follows.

Figure 12:
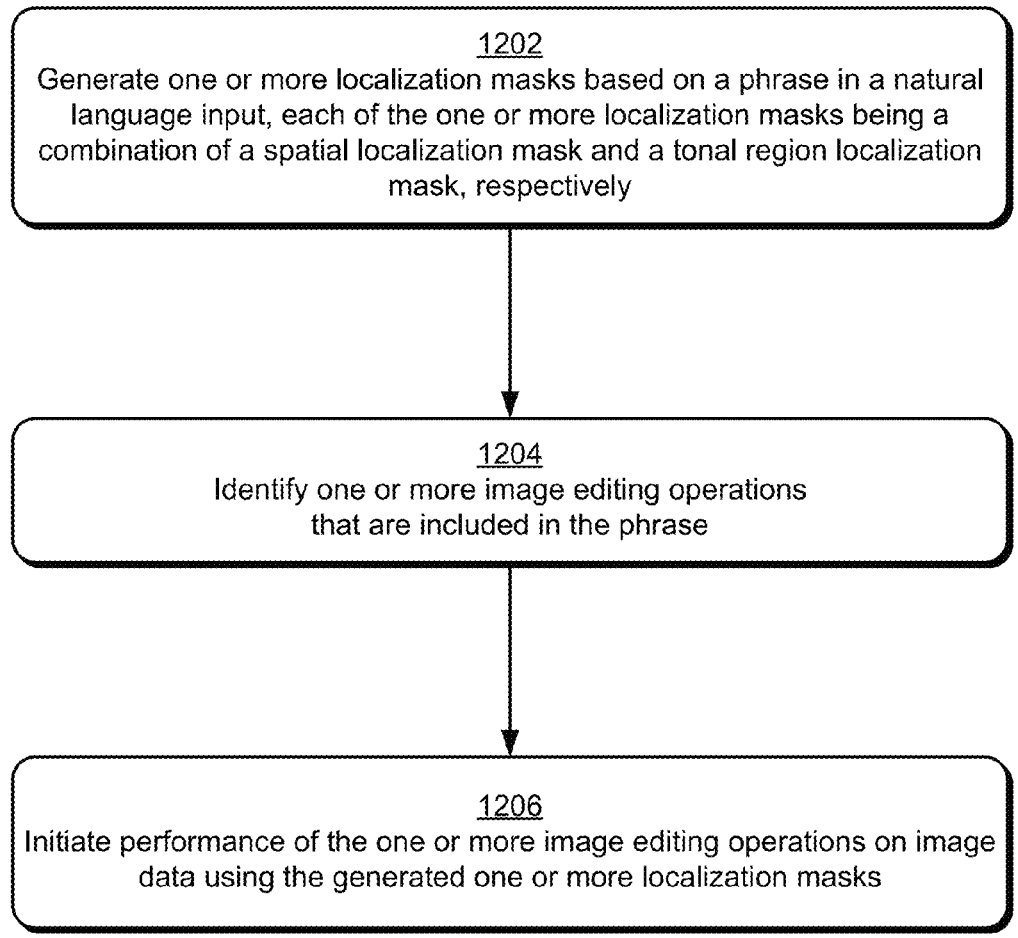
FIG. 12 is a flow diagram depicting a procedure in an example implementation in which a localization mask is generated that includes a spatial localization mask and a tonal region localization mask.

FIG. 12 depicts a procedure 1200 in an example implementation in which a localization mask is generated that includes a spatial localization mask and a tonal region localization mask. One or more localization masks are generated based on a phrase in a natural language input, each of the one or more localization masks being a combination of a spatial localization mask and a tonal region localization mask, respectively (block 1202). The spatial localization mask, for instance, may include spatial components that define a shape to convey a local operation, a spatial gradient function, a border function, and so on as described in relation to FIG. 6. The tonal region localization mask may include components configured to modulate tonal shapes.

One or more image editing operations are identified that are included in the phrase (block 1204). A natural language processing module 116, for instance, may identify image editing operations using lexical ontologies and semantic distances, such as to support mapping of a generalized vocabulary to a constrained vocabulary.

Performance is initiated of the one or more image editing operations on image data using the generated one or more localization masks (block 1206). Thus, a combination of the masks and the identified image editing operation may be used to support localized performance of the operation.

Software Implementation Example

The following details an example software implementation that may be utilized to perform localized image compositing operations. In a first example, this image editing operation incorporates a composition of multiple filters along with spatial and tonal localization of the overall filter effects as follows:

```
localized_filter (I0, Filter_parameters, Spatial_description,
Tonal_description, filter_strength)
{
    Nf = Filter_parameters.number_of_filters
    // composite multiple filters together
    I = I0
    for (a = 0; a < Nf; ++a)
    {
        filter_function = Filter_parameters[a].filter_function
        parameters = Filter_parameters[a].parameters
        blend_amount = Filter_parameters[a].blend_amount
        I = blend (I, filter_function, parameters, blend_amount)
    }
    localization_mask = generate_localization_mask (I0,
    Spatial_description, Tonal_description)
    // blend the filtered composite image with the localization mask
    return blend (I0, I, filter_strength * localization_mask)
}
```

This a simpler function which applies a single filter and then modulates it with the localization mask single localized filter (I0, Filter_parameters, Spatial_description, Tonal_description, filter_strength) as follows:

```
{
    I1 = filter_function (I0, Filter_parameters)
    localization_mask = generate_localization_mask (I0,
    Spatial_description, Tonal_description)
    return blend (I0, I1, filter_strength * localization_mask)
}
```

The various parameters are specified as:

Spatial_description={amplitude, Gaussian_description, Gradient_description, Border_description}
  Type={border, not_border}
  Gaussian_description={amplitude, center_point, x_width, y_width, orientation_angle}
  Gradient_description={amplitude, point1, point2, orientation_angle, feather_amount1, feather_amount2}
  Border_description={amplitude, thickness, feather}
Tonal_description={amplitude, Strengths, Powers}

Strengths={shadow_strength, midtone_strength, highlight_strength}
Powers={shadow_power, midtone_power, highlight_power}

The following may be used to produce a mask which combines spatial and tonal modulations:

```
generate_localization_mask (Image, , Spatial_description,
Tonal_description)
    {
        a_space = Spatial_description.amplitude
        a_tone = Tonal_description.amplitude
        tone_mask = generate_tone_mask (Image, Tonal_description)
        spatial_mask = generate_spatial_mask (Spatial_description)
        return screen (a_space * spatial_mask, a_tone * tone_mask)
    }
```

The following may be used as a symmetric, two argument screen function for combining mask values screen (x1, x2):

```
    {
        return x1 + x2 − x1 x2
    }
```

The following may be used to blend two images together modulated by the specified mask. The output image is represented as values of I0 where mask is zero and I1 where mask is unity blend (I0, I1, mask):

```
    {
        return (1 − mask) * I0 + mask * I1
    }
generate_tone_mask (Image, Tonal_description)
    {
        s_s = Tonal_description.Strengths.shadow_strength
        s_m = Tonal_description. Strengths .midtone_strength
        s_h = Tonal_description. Strengths .highlight_strength
        mu_s = Tonal_description.Powers.shadow_power
        mu_m = Tonal_description.Powers.midtone_power
        mu_h = Tonal_description.Powers.highlight_power
        mask    = s_s *power ( (1 − Image)^2, mu_s) +
            s_m * power (4 * Image * (1− Image), mu_m) +
            s_h * power (Image^2, mu_)
        return mask;
    }
```

The following is a spatial function which combines an elliptical Gaussian (possibly rotated) to capture location-specific information (e.g., "make it brighter here," "a bit thinner though") along with a linear gradient to capture more distributed spatial information (e.g., "there needs to be less contrast at the top") and a border mask which may be used to constrain effects to the image periphery.

```
generate_spatial_mask (Spatial_description)
{
        a_G = Spatial_description.Gaussian_description.amplitude
        a_g = Spatial_description.Gradient_description.amplitude
        a_b = Spatial_description.Border_description.amplitude
        Gaussian =
        generate_Gaussian (Spatial_description.Gaussian_description)
        gradient =
        generate_gradient (Spatial_description.Gradient_description)
        border = generate_border
        (Spatial_description.Border_description)
        return screen (a_G Gaussian, a_g gradient, a_b border)
}
```

The following is a totally, three argument screen function for combining mask values screen (x1, x2, x3).

```
    {
        return x1 + x2 + x3 − x1 x2 − x2 x3 − x3 x1 + x1 x2 x3
    }
```

The following refers to a simple cubic function which resembles a sigmoid function but has an abrupt cutoff at 0 and 1.

```
        cubic_sigmoid (x)
        {
            return (x <= 0) ? 0:
                (1 <= x) ? 1:
                x * x * (3 − 2 * x);
        }
```

The following may be used to create a border mask that is zero in the interior of the image and gently tapers to unity at the image edges.

```
generate_border (Border_description)
    {
        d = distance_to_image_boundary
        x = (Border_description.thickness − d)/Border_description.feather
        border_mask = (Border_description.thickness < d) ?    0 :
                                    cubic_sigmoid (x)
        return border_mask;
    }
```

The following may be used to generate a Gaussian function centered about a specified center point, which in general may be defined as an elliptical Gaussian oriented at an arbitrary angle but for simplicity a symmetric description is provided here.

```
        generate_Gaussian (Gaussian_description)
            {
                r0 = Gaussian_description.center_point
                sigma = Gaussian_description_x_width;
                for each coordinate r
                M(r) = exp (−(r − r0)^2/(2 sigma^2))
                    return M
            }
        generate_gradient (Gradient_description)
            {
                r1 = Gradient _description.r1
                r2 = Gradient _description.r2;
                for each coordinate r
                {
                        d = (r − r1). (r2 − r1) / |r2 − r1|
                M(r) =        (d < 0) ? 0
                    (1 < d) ? 1
                    d
                }
                return M
            }
```

Example System and Device

Figure 13:
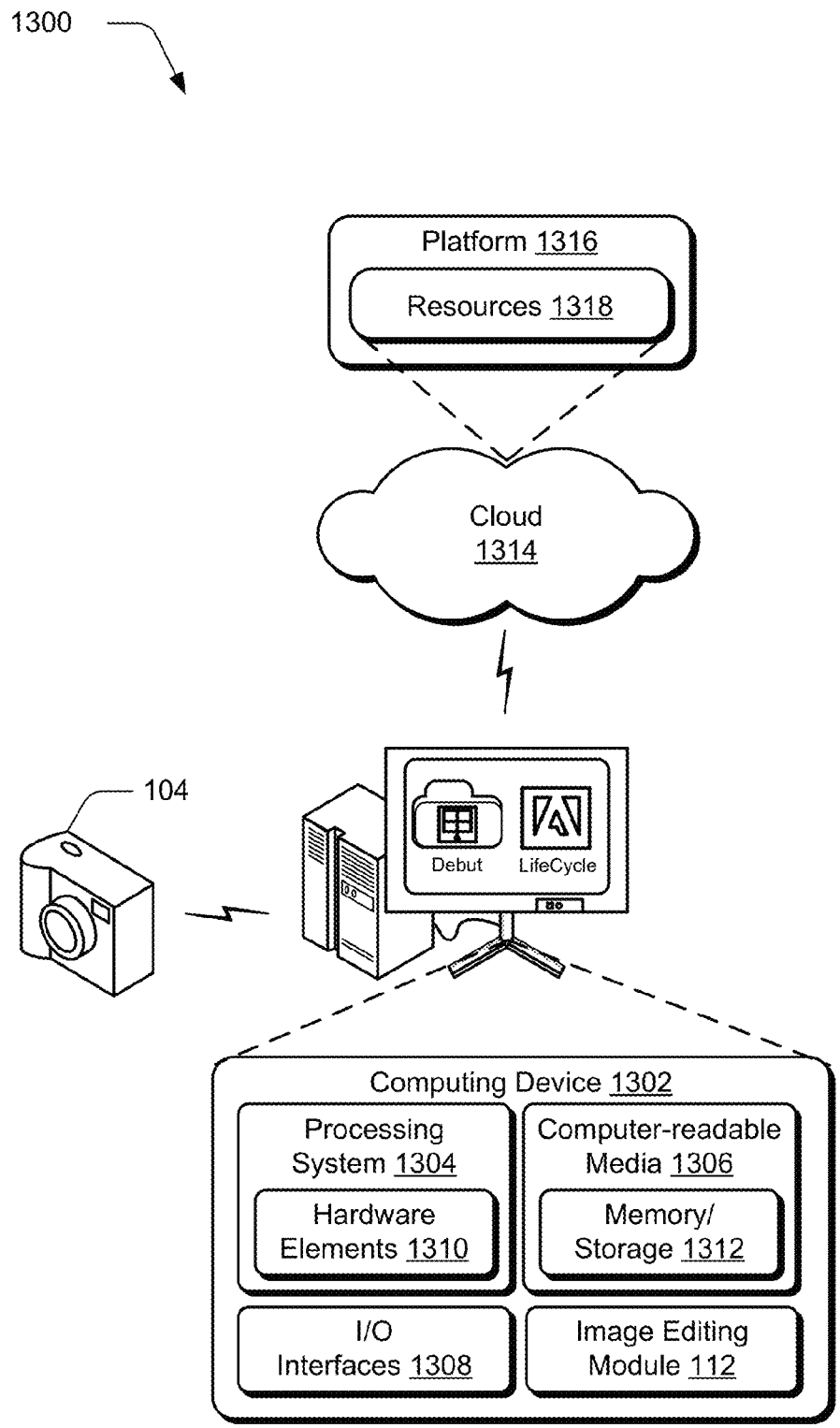
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the image editing module 112, which may be configured to process image data, such as image data captured by an image capture device 104. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   receiving a natural language input converted from audio data using a speech-to-text engine;
   recognizing a gesture from at least one touch input detected using at least one touch sensor;
   identifying, from a combination of the natural language input and the recognized gesture, an image editing operation to be performed on image data of an image; and
   performing the identified image editing operation by editing the image data of the image to alter at least one pixel of the image.

2. A method as described in claim 1, wherein the gesture specifies the image editing operation to be performed and the natural language input specifies a subject of the image editing operation.

3. A method as described in claim 1, wherein the at least one touch sensor is configured to implement touchscreen functionality of a display device that displays the image.

4. A method as described in claim 1, further comprising determining a portion of the image that corresponds to the natural language input and the performance of the image editing operation involves the determined portion.

5. A method as described in claim 4, wherein the natural language input involves a name and the determining is performed to define at least part of a boundary of at least a portion of the image that is associated with the name.

6. A method as described in claim 5, wherein the name is a name of a landmark and the determining further comprises identifying the landmark in the image.

7. A method as described in claim 1, wherein at least one of the natural language input or the gesture specifies a degree to which the image editing operation is to be performed.

8. A method as described in claim 1, wherein the image editing operation involves spatial localization.

9. A method as described in claim 1, wherein the image editing operation involves two or more filter operations.

10. A method comprising:
    obtaining a natural language input by a computing device;
    recognizing a gesture from at least one touch input detected using touchscreen functionality of a display device of the computing device, the display device displaying an image;
    identifying, from a combination of the natural language input and the recognized gesture, an image editing operation to be performed by the computing device on image data of the image; and
    performing the identified image editing operation by editing the image data of the image to alter at least one pixel of the image.

11. A method as described in claim 10, wherein the natural language input is converted to text from audio data using a speech-to-text engine.

12. A method as described in claim 10, wherein the natural language input includes text that is manually entered by a user.

13. A method as described in claim 10, wherein at least one of the gesture or the natural language input identifies the image editing operation and the other of the gesture or the natural language input identifies a subject of the image editing operation.

14. A method as described in claim 13, wherein the subject is a portion of the image to which the image editing operation is performed.

15. A method as described in claim 10, wherein the natural language input involves a name, and the identifying further comprises determining a portion of the image that corresponds to the name.

16. A system comprising:
    a speech-to-text engine configured to convert audio data into a natural language input comprising text;
    a gesture module configured to recognize a gesture from at least one touch input detected using at least one touch sensor; and
    a natural language processing module configured to:
       identify, from a combination of the natural language input and the gesture, an image editing operation to be performed on image data of an image; and initiate performance of the image editing operation by a computing device to edit the image data of the image to alter at least one pixel of the image.

17. A system as described in claim 16, wherein at least one of the natural language input or the gesture specifies a degree to which the image editing operation is to be performed.

18. A system as described in claim 16, wherein the speech-to-text engine is configured to form a communication for communication via a network to another speech-to-text engine responsive to a determination that at least a portion of the audio data to be converted to text does not meet a threshold, the communication including the portion of the audio data.

19. A system as described in claim 16, wherein the gesture identifies a base of the image that is to be subject of further processing by an object identification module to determine a boundary of an object that includes the base.

20. A system as described in claim 16, wherein the natural language input involves a name, the natural language processing module further configured to determine a portion of the image that corresponds to the name.

\* \* \* \* \*